US011993950B2

(12) United States Patent
Yang et al.

(10) Patent No.: US 11,993,950 B2
(45) Date of Patent: May 28, 2024

(54) SELF-CENTERING CONICAL FRICTION DAMPER

(71) Applicant: THE UNIVERSITY OF BRITISH COLUMBIA, Vancouver (CA)

(72) Inventors: Tsung Yuan Yang, Vancouver (CA); Hengchao Xu, Burnaby (CA); Lisa Tobber, Vancouver (CA)

(73) Assignee: The University of British Columbia, Vancouver (CA)

( * ) Notice: Subject to any disclaimer, the term of this patent is extended or adjusted under 35 U.S.C. 154(b) by 241 days.

(21) Appl. No.: 17/632,932

(22) PCT Filed: Aug. 7, 2020

(86) PCT No.: PCT/CA2020/051092
§ 371 (c)(1),
(2) Date: Feb. 4, 2022

(87) PCT Pub. No.: WO2021/026643
PCT Pub. Date: Feb. 18, 2021

(65) Prior Publication Data
US 2022/0290457 A1 Sep. 15, 2022

Related U.S. Application Data
(60) Provisional application No. 62/884,805, filed on Aug. 9, 2019.

(51) Int. Cl.
*E04H 9/02* (2006.01)
*F16F 7/08* (2006.01)

(52) U.S. Cl.
CPC ........... *E04H 9/0215* (2020.05); *F16F 7/082* (2013.01); *F16F 2228/004* (2013.01)

(58) Field of Classification Search
CPC ........ E04H 9/0215; E04H 9/021; F16F 7/082; F16F 2228/004; F16F 2228/001; F16F 7/08
See application file for complete search history.

(56) References Cited

U.S. PATENT DOCUMENTS 8,641,282 B2 * 2/2014 Chuang ................... F16C 29/02
384/36
9,175,468 B1 * 11/2015 Tsai ......................... E01D 19/04
(Continued)

FOREIGN PATENT DOCUMENTS

CN 110173060 A * 8/2019
CN 110258813 A * 9/2019 ............... E04B 1/36
(Continued)

OTHER PUBLICATIONS

Yang, T. Y. et al., "Mechanism and experimental validation of innovative self-centering conical friction damper", 2020.
(Continued)

*Primary Examiner* — Brian D Mattei
*Assistant Examiner* — Omar F Hijaz
(74) *Attorney, Agent, or Firm* — Oyen Wiggs Green & Mutala LLP

(57) ABSTRACT

Example embodiments provide mechanical dampers. The mechanical dampers may be applied to dissipate energy in a structure that arises for example from a dynamic load such as seismic activity, vehicle impact, vibration of the structure, wind forces, an explosion, etc. The damper comprises a pair of clamping plates. A shear plate is held between the clamping plates. The shear plate is movable in transverse directions relative to the clamping plates. The damper also comprises a conical wedge coupled between one of the clamping plates and the shear plate. The conical wedge comprises a female conical element and a male conical (Continued)

element that projects into a conical indentation of the female conical element.

20 Claims, 16 Drawing Sheets

(56) References Cited

U.S. PATENT DOCUMENTS

| | | | | |
|---|---|---|---|---|
| 9,435,087 | B2* | 9/2016 | Kim | E01D 19/046 |
| 11,136,779 | B2* | 10/2021 | Kim | E04B 1/36 |
| 2003/0094560 | A1* | 5/2003 | Tsai | E04H 9/021 |
| | | | | 248/618 |
| 2003/0167707 | A1* | 9/2003 | Tsai | E04H 9/023 |
| | | | | 52/167.6 |
| 2003/0223659 | A1* | 12/2003 | Lee | E04H 9/023 |
| | | | | 384/36 |
| 2006/0174555 | A1* | 8/2006 | Zayas | E04H 9/021 |
| | | | | 52/167.4 |

FOREIGN PATENT DOCUMENTS

| | | | |
|---|---|---|---|
| JP | 2009-150182 A | | 7/2009 |
| KR | 20090112512 A | * | 10/2009 |
| WO | 2016185432 A1 | | 11/2016 |

OTHER PUBLICATIONS

Xu, H., "Mechanism and Experimental Validation of Innovative Self-Centering Conical Friction Damper", Thesis for Master of Applied Science submitted 2019.

Pall, A. S. et al., "Response of Friction Damped Braced Frames", Journal of Structural Engineering, 1982, 108(9): 1313-1323.

Grigorian, C. E. et al., Slotted Bolted Connection Energy Dissipators, Earthquake Spectra, 1993, 9(3): 491-504.

Monir, H. S. et al., "A modified friction damper for diagonal bracing of structures", Journal of Constructional Steel Research, 2013, 87: 17-30.

Mualla, I. H. et al., "Performance of steel frames with a new friction damper device under earthquake excitation", Engineering Structures, 2002, 24(3): 365-371.

Hashemi, A. et al., "Seismic resistant rocking coupled walls with innovative Resilient Slip Friction (RSF) joints", Journal of Constructional Steel Research, 129 (2017), 215-226.

Yama, J. et al., "Self-centering MRFs with bottom flange friction devices under earthquake loading", Journal of Constructional Steel Research, 65(2) (2009), 314-325.

Tsai, K.-C. et al., "Seismic self-centering steel beam-to-column moment connections using bolted friction devices", Earthquake Engineering & Structural Dynamics, 37(4) (2008), 627-645.

Nims, D. K. et al., "The Use of the Energy Dissipating Restraint for Seismic Hazard Mitigation", Earthquake Spectra, 1993, 9(3): 467-489.

Filiatrault, A. et al., "Performance Evaluation of Friction Spring Seismic Damper", Journal of Structural Engineering, 2000, 126(4): 491-499.

Aiken, I. D. et al., "Testing of Passive Energy Dissipation Systems", Earthquake Spectra, 9(3), 335-370, 1993.

Richter, P. J. et al., The EDR-energy dissipating restraint. A new device for mitigation of seismic effects. In Proceedings of the 1990 SEAOC Convention, vol. 1, pp. 377-401, Sep. 1990.

* cited by examiner

SELF-CENTERING CONICAL FRICTION DAMPER

CROSS-REFERENCE TO RELATED APPLICATIONS

This application claims priority from U.S. application No. 62/884,805 filed 9 Aug. 2019 and entitled SELF-CENTERING CONICAL FRICTION DAMPER which is hereby incorporated herein by reference for all purposes. For purposes of the United States of America, this application claims the benefit under 35 U.S.C. § 119 of U.S. application No. 62/884,805 filed 9 Aug. 2019 and entitled SELF-CENTERING CONICAL FRICTION DAMPER.

FIELD

The present disclosure relates to mechanical dampers. Some embodiments provide dampers which may be integrated into a structure to dissipate forces applied to the structure, for example as a result of seismic activity.

BACKGROUND

Buildings typically comprise a structural frame. If an earthquake occurs, the structural frame may be damaged. A severe earthquake may damage the structural frame of a building enough to make the building structurally unsound and uninhabitable. Mechanical dampers may be integrated into the structural frame of buildings to reduce damage caused by earthquakes (or other mechanical excitations).

The following references describe various mechanical dampers:
1. Pall A. S., Marsh C. Response of friction damped braced frames[J]. Journal of Structural Engineering, 1982, 108 (9): 1313-1323.
2. Richter, P. J., Nims, D. K., Kelly, J. M., & Kallenbach, R. M. (1990, September). The EDR-energy dissipating restraint. A new device for mitigation of seismic effects. In Proceedings of the 1990 SEAOC Convention (Vol. 1, pp. 377-401).
3. Grigorian C. E., Yang T. S., Popov E. P. Slotted bolted connection energy dissipators[J]. Earthquake Spectra, 1993, 9(3): 491-504.
4. Aiken, I. D., Nims, D. K., Whittaker, A. S., & Kelly, J. M. (1993). Testing of passive energy dissipation systems. Earthquake spectra, 9(3), 335-370.
5. Nims D. K., Richter P. J., Bachman R. E. The use of the energy dissipating restraint for seismic hazard mitigation [J]. Earthquake Spectra, 1993, 9(3): 467-489.
6. Filiatrault A., Tremblay R., Kar R. Performance evaluation of friction spring seismic damper[J]. Journal of Structural Engineering, 2000, 126(4): 491-499.
7. Mualla I. H., Belev B. Performance of steel frames with a new friction damper device under earthquake excitation [J]. Engineering Structures, 2002, 24(3): 365-371.
8. Tsai, K. C., Chou, C. C., Lin, C. L., Chen, P. C., & Jhang, S. J. (2008). Seismic self-centering steel beam-to-column moment connections using bolted friction devices. Earthquake Engineering & Structural Dynamics, 37(4), 627-645.
9. Iyama, J., Seo, C. Y., Ricles, J. M., & Sause, R. (2009). Self-centering MRFs with bottom flange friction devices under earthquake loading. Journal of Constructional Steel Research, 65(2), 314-325.
10. Monir H. S., Zeynali K. A modified friction damper for diagonal bracing of structures[J]. Journal of Constructional Steel Research, 2013, 87: 17-30.
11. Hashemi, A., Zarnani, P., Masoudnia, R., & Quenneville, P. (2017). Seismic resistant rocking coupled walls with innovative Resilient Slip Friction (RSF) joints. Journal of Constructional Steel Research, 129, 215-226.

There is a need for improved mechanical dampers which can better dissipate mechanical forces that may be applied to a structure.

SUMMARY

This invention has a number of aspects. These include without limitation:
  mechanical dampers;
  structures that include mechanical dampers;
  methods for dissipating mechanical energy.

One aspect of the technology described herein provides mechanical dampers. In one embodiment a mechanical damper comprises a pair of clamping plates and a shear plate located between the pair of clamping plates. The shear plate may have a face frictionally engaged with a first one of the clamping plates. The shear plate is movable in one or more transverse directions relative to the pair of clamping plates. The shear plate and the first one of the clamping plates may be frictionally engaged with a coefficient of friction $\mu$. A wedge is coupled between a second one of the clamping plates and the shear plate, The wedge comprises a female element and a male element that projects into an indentation in the female element. An active surface portion of the male element is in frictional contact with an active surface portion of the female element with a coefficient of friction $\mu'$. The active surface portion of the male element is convex and the active surface portion of the female element is concave, A bias mechanism is operative to compress the shear plate and wedge between the clamping plates.

In some embodiments the wedge is a conical wedge and the male and female elements are conical elements. The active surface portions of the male and female conical elements have a slope angle ($\theta$) relative to a base surface of the conical element that is greater than 0°.

In some embodiments the bias mechanism comprises a spring or a plurality of springs.

In some embodiments the bias mechanism comprises a plurality of bolts that each pass through a corresponding clearance hole in at least one of the clamping plates. Each of the plurality of springs may be arranged to apply tension to a corresponding one of the plurality of bolts.

In some embodiments the clearance holes are spaced apart around a periphery of the one of the clamping plates.

In some embodiments the plurality of springs comprise Belleville washers.

In some embodiments the bias mechanism provides force that varies non-linearly with compression.

In some embodiments the active surface portion of the male conical element lies on a first conical surface having a first cone angle and the active surface portion of the female conical element lies on a second conical surface having the first cone angle.

In some embodiments the active surface portion of the male conical element has the form of a truncated cone.

In some embodiments the active surface portion of the male conical element extends into the indentation of the female conical element and engages the active surface portion of the female conical element.

In some embodiments the active surface portion of the male conical element is formed to maintain contact with the active surface portion of the female conical element along a line as the male and female conical elements are displaced relative to one another in a transverse direction perpendicular to an axis of the male conical element.

In some embodiments μ' is not the same as μ. In some embodiments μ' is greater than μ. In some embodiments μ' is less than μ.

In some embodiments μ' is the same as μ.

In some embodiments the slope angle (θ) of one or both of the male and female conical elements satisfies the relationship:

$$\tan\theta > \frac{\mu + \mu'}{1 - \mu \cdot \mu'}.$$

In some embodiments the slope angle (θ) of one or both of the male and female conical elements satisfies the relationship:

$$\tan\theta = \frac{\mu + \mu'}{1 - \mu \cdot \mu'}.$$

In some embodiments the slope angle (θ) of one or both of the male and female conical elements satisfies the relationship:

$$\tan\theta < \frac{\mu + \mu'}{1 - \mu \cdot \mu'}.$$

In some embodiments the absence of applied force to the mechanical damper is self-centering.

In some embodiments μ' is less than or equal to $$\frac{1}{10}\theta.$$

In some embodiments:

$$F_N\left(\frac{\tan\theta - \mu'}{1 + u'\tan\theta} - \mu\right) > 0$$

wherein $F_N$ is a normal force generated by compression of the bias mechanism.

In some embodiments:

$$F_N\left(\frac{\tan\theta - \mu'}{1 + u'\tan\theta} - \mu\right) = 0$$

wherein $F_N$ is a normal force generated by compression of the bias mechanism.

In some embodiments:

$$F_N\left(\frac{\tan\theta - \mu'}{1 + u'\tan\theta} - \mu\right) < 0$$

wherein $F_N$ is a normal force generated by compression of the bias mechanism.

In some embodiments $F_f$ is given by:

$$F_f = \mu F_{PT}$$

wherein $F_{PT}$ is a pretension force applied by the bias mechanism when the male cone element is in a neutral position in which the male conical element is centered relative to the female conical element.

In some embodiments $F_f'$ is given by:

$$F_f' = \frac{\mu' F_{PT}}{\cos\theta - \mu'\sin\theta}$$

wherein $F_{PT}$ is a pretension force applied by the bias mechanism when the male cone element is in a neutral position in which the male conical element is centered relative to the female conical element.

In some embodiments the shear plate is movable relative to the clamping plates in two mutually perpendicular transverse directions.

In some embodiments the first and second clamping plates are slidably coupled to one another by a slide mechanism which maintains the first and second clamping plates parallel to one another.

In some embodiments the slide mechanism comprises a pair of bars projecting perpendicular to one of the clamping plates that engage in a corresponding pair of keyways or apertures in the other one of the clamping plates.

In some embodiments the pair of bars block the shear plate from moving outside of a set range of motion in at least one transverse direction.

In some embodiments the mechanical damper comprises plural stoppers arranged to limit travel of the shear plate relative to the clamping plates to a set range in at least one transverse direction.

In some embodiments the indentation of the female conical element has a diameter that is at least equal to one half of the length of the set range.

In some embodiments at least one of the shear plate and the first clamping plate comprises a friction layer that bears against the other of the shear plate and the first clamping plate.

In some embodiments the friction layer comprises a material having a coefficient of friction that does not exceed 0.5.

In some embodiments the friction layer comprises a plastic material.

In some embodiments the friction layer comprises one or more of Teflon, brass and steel.

In some embodiments the friction layer is on an interchangeable facing plate.

In some embodiments the coefficient of friction between the active surface portions of the male and female conical elements μ' increases with transverse displacements of the shear plate.

In some embodiments the active surface portion of the male conical element comprises a first material located inside a ring of a second material different from the first material.

In some embodiments one or both of the active surface portion of the male conical element and the active surface portion of the female conical element is coated with a friction modifying coating.

In some embodiments when the male conical element is in a neutral position in which the male conical element is centered relative to the female conical element, the male conical element bears against the female conical element with a pretension force of at least 10 kN.

In some embodiments the conical wedge is detachably affixed to each of the shear plate and the first clamping plate.

In some embodiments the shear plate is formed integrally with the male conical element or the female conical element.

In some embodiments the shear plate and either the male conical element or the female conical element are provided by a single casting.

In some embodiments the mechanical damper comprises a second conical wedge.

In some embodiments the second conical wedge is positioned between the second one of the clamping plates and the shear plate in parallel with the first conical wedge.

In some embodiments the second conical wedge is positioned between the second one of the clamping plates and the shear plate in series with the first conical wedge.

In some embodiments the coefficient of friction between the active surface portions of the male and female conical elements of the second wedge is different from $\mu'$.

In some embodiments the coefficient of friction between the active surface portions of the male and female conical elements of the second wedge is the same as $\mu'$.

In some embodiments the slope angle ($\theta$) of one or both of the active surface portions of the male and female conical elements is between 10° and 25°.

In some embodiments $\mu$ is between 0.01 and 0.5.

In some embodiments $\mu'$ is between 0.01 and 0.5.

In some embodiments a pretension force applied by the bias mechanism is between 10 kN and 1000 kN.

In some embodiments a diameter of the conical wedge is between 100 mm and 250 mm.

In some embodiments a thickness of one or both of the clamping plates is between 15 mm and 35 mm.

In some embodiments the mechanical damper comprises a first coupling member connected to move together with the shear plate and a second coupling member connected to move together with the first and second clamping plates.

Another aspect of the technology described herein provides a structure. The structure may comprise first and second structural members connected to one another by a mechanical damper as described elsewhere herein.

In some embodiments the first structural member is a horizontal member and the second structural member is a vertical member.

In some embodiments the structure is a building having two or more stories.

In some embodiments the structure is a traffic barricade.

In some embodiments the structure is a blast wall. The first structural member may support a movable outer wall and the second structural member may be a fixed support for the movable outer wall.

Another aspect of the technology described herein provides a mechanical damper. The mechanical damper may comprise a pair of clamping members. The mechanical damper may also comprise a shear plate located between the pair of clamping members. The shear plate may have a face frictionally engaged with a first one of the clamping members and may be movable in a transverse direction relative to the pair of clamping members. The mechanical damper may also comprise a wedge coupled between a second one of the clamping members and the shear plate. The wedge may comprise a female element and a male element that projects into an indentation in the female element with an active surface portion of the male element in frictional contact with an active surface portion of the female element.

The mechanical damper may also comprise a bias mechanism operative to compress the shear plate and wedge between the clamping members.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

FIGS. 3A, 3C, 3E, 3G, 3I and 3K are schematic side views of the damper. FIGS. 3B, 3D, 3F, 3H, 3J and 3L are graphical representations of corresponding stages of the hysteresis cycle.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
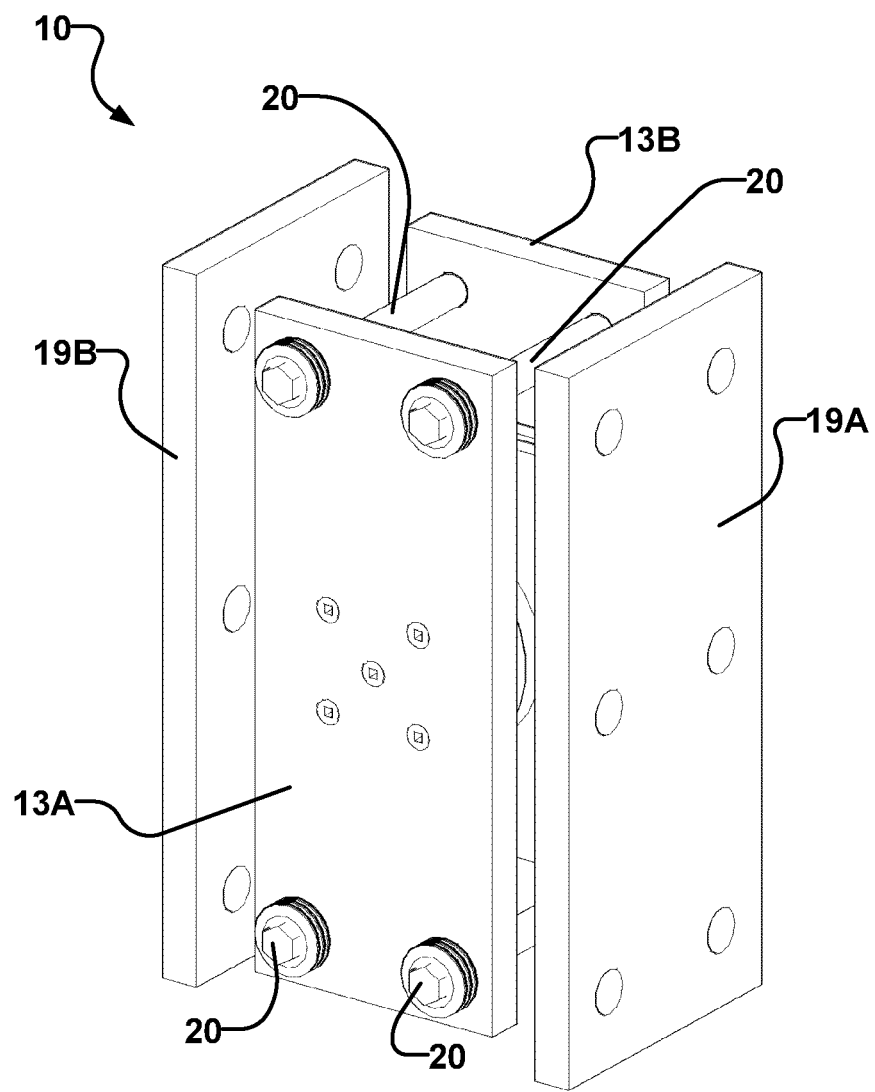
FIG. 1 is a perspective view of a damper according to an example embodiment of the invention.

FIG. 1 is a perspective view of a damper 10 according to an example embodiment of the invention. One or more dampers 10 may be integrated into a structure to dissipate mechanical energy. Damper 10 is a "passive" damper meaning that it does not require electrical power or an active control system. Damper 10 may be constructed so that it automatically returns to a neutral or resting state (e.g. the state of damper 10 prior to damper 10 being excited by the mechanical energy) after a disturbance has passed. Damper 10 may dissipate mechanical energy that applies forces to damper 10 from a single direction or multiple directions.

A non-limiting example application of damper 10 is to dissipate mechanical energy imparted to a structure by an event such as an earthquake or a vehicle strike. For example, damper 10 may be integrated into the structure of a building to reduce damage to the building from an earthquake or integrated into a traffic barrier to dissipate energy from a vehicle strike. Damper 10 may advantageously dissipate the mechanical energy from the event and subsequently return to its neutral state.

Damper 10 may be coupled between two parts of a structure (e.g. integrated into a structural frame of the structure). Damper 10 may then absorb energy when applied forces make the two parts of the structure move relative to one another. For example, damper 10 may be coupled between:
- two structural elements (e.g. trusses, joists, beams and/or the like) of a structure;
- two parts of a structural element of a structure;
- a brace and a wall (e.g. a concrete wall);
- a beam (e.g. a header) and a wall (e.g. a concrete portion of an elevator shaft);
- between a structure and a foundation element;
- within a structural element (e.g. within a tube-in-tube brace, within a column, etc.);
- etc.

A structure may comprise a plurality of dampers 10. For example, a multi-storey structure may include one or more dampers 10 per story of the structure.

Advantageously a damper 10 may be connected to dissipate energy from forces or combinations of forces directed in different directions. For example, a damper may be applied to dissipate energy from forces applied to a structural member in both a vertical direction and a horizontal direction (or any combination of these) or in any horizontal direction.

Figure 2A:
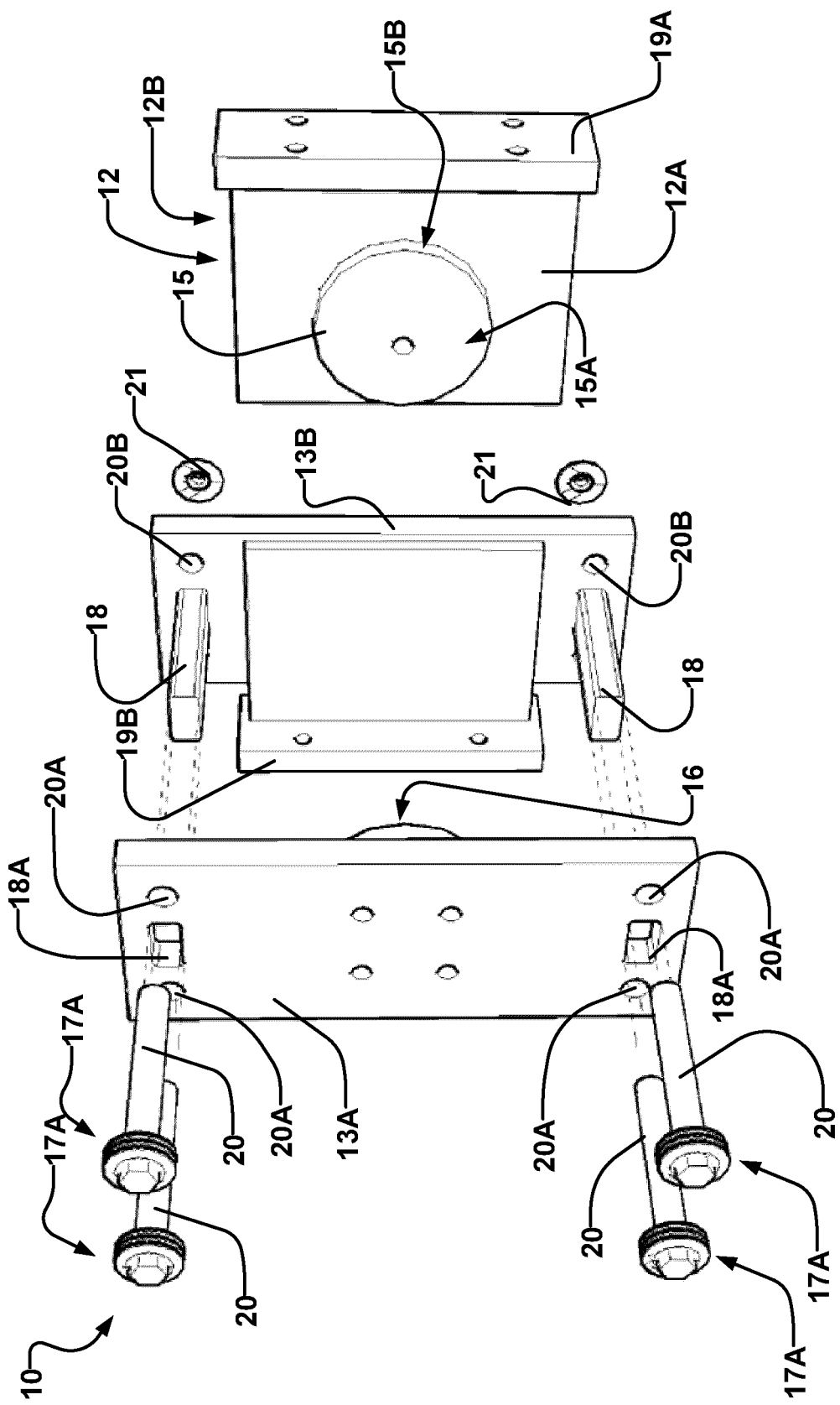
FIG. 2A is an exploded perspective view of the damper of FIG. 1.

FIG. 2A is an exploded perspective view of damper 10. Damper 10 comprises a shear plate 12 that is held between a pair of clamping plates 13A and 13B (collectively clamping plates 13). Clamping plates 13 are biased toward shear plate 12 as discussed below.

Shear plate 12 is spaced apart from at least one of clamping plates 13 by a conical wedge assembly 14 that includes a male conical element 15 and a female conical element 16. In the illustrated embodiment, male conical element 15 is attached to move together with shear plate 12 and female conical element 16 is attached to move together with clamping plate 13A.

Male conical element 15 projects from a face 12A of shear plate 12. In some embodiments male conical element 15 is integral with shear plate 12 (e.g. male conical element 15 and shear plate 12 are cast together or machined together from a solid piece of material or formed together by 3D printing and sintering). In some embodiments male conical element 15 is coupled to shear plate 12A (e.g. by welding, brazing, bonding, by bolts or other fasteners, by press fitting, etc.).

Male conical element 15 comprises an active surface portion 15A which lies on a surface that is at least generally conical. However, the outer surface of male conical element 15 need not correspond exactly to a cone. In some embodiments active surface portion 15A has the form of a truncated cone such as a conical frustum. In some embodiments (as shown in FIG. 2A) male conical element 15 comprises a base portion 15B. Base portion 15B may, for example be cylindrical or may be sloped less than or more than surface portion 15A. "Active surface portion" of male conical element 15 means a surface of male conical element 15 which may frictionally engage an opposing surface of female conical element 16 to dissipate energy from forces applied to damper 10.

Female conical element 16 is attached to clamping plate 13A. In some embodiments female conical element 16 is integral with clamping plate 13A (e.g. female conical element 16 and clamping plate 13A are cast together or machined together from a solid piece of material or formed together by 3D printing and sintering). In some embodiments female conical element 16 is coupled to clamping plate 13A (e.g. by welding, brazing, bonding, by bolts or other fasteners, by press fitting, etc.).

Figure 2B:
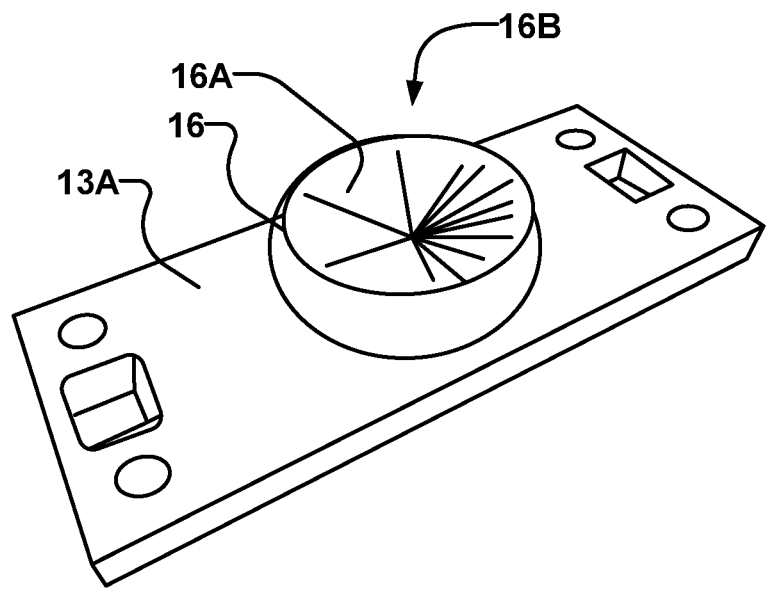
FIG. 2B is a perspective view of a female conical element according to an example embodiment of the invention.

As shown in FIG. 2B, female conical element 16 is formed to provide an indentation 16B facing toward male conical element 15. An active surface portion 16A inside indentation 16B of female conical element 16 lies on a surface that is at least generally conical. Active surface portion 16A preferably has a cone angle that matches a cone angle of active surface portion 15A of male conical element 15. "Active surface portion" of female conical element 16 means a surface of female conical 16 which may frictionally engage an opposing surface of male conical element 15 to dissipate energy from forces applied to damper 10.

Female conical element 16 is positioned opposite to male conical element 15. Active surface portion 15A of male conical element 15 extends into indentation 16B of female conical element 16 and engages active surface portion 16A of female conical element 16.

Active surface portion 16A of female conical element 16 generally conforms to active surface portion 15A of male conical element 15. However, an exact match between these surfaces is not required in all cases. For example, the surface of indentation 16B of female conical element 16 may have the form of a cone while active surface 15A of male conical element 15 has the form of a conical frustum.

Clamping plates 13A and 13B are biased toward one another by a bias mechanism such that active surface portion 15A of male conical element 15 is forced against active surface portion 16A of female conical element 16 with significant force and face 12B of shear plate 12 is forced against a face of clamping plate 13B.

The bias mechanism is configured to allow clamping plates 13A and 13B to move apart from one another when damper 10 is in operation. For example clamping plates 13A and 13B may be biased toward one another by suitable springs. In the illustrated example embodiment of damper 10, clamping plates 13 are biased toward one another by springs 17 made up of stacks of Belleville washers 17A (also called "disc springs" or "conical washers"). Each spring 17 is captured between the head of a corresponding bolt 20 and clamping plate 13A. The number of and arrangement of Belleville washers in each spring 17 may be selected to provide a desired pretension force, a desired relationship between force and compression and a desired travel of springs 17. Springs 17 may be provided adjacent to either one or both of clamping plates 13A and 13B.

Bolts 20 may, for example, pass through clearance holes in clamping plate 13A and clamping plate 13B and be held by nuts 21 or may be threaded into or otherwise affixed to clamping plate 13B.

Springs 17 are preloaded such that when damper 10 is in a "neutral" position with male conical element fully engaged and centered with respect to conical indentation 16B of female conical element 16 a desired pretension force ($F_{PT}$) is applied by each of springs 17. Bolts 20 are selected to be able to withstand tension equal to the maximum forces expected from springs 17. In some embodiments bolts 20 are high strength bolts (e.g. bolts that satisfy the requirements for grace 8 bolts according to SAE standard J429).

The total force biasing plates 13 together is therefore given by $N \times F_{PT}$ where N is the number of bolts 20 with springs 17. Damper 10 may, for example, comprise four bolts 20 which each extend through corresponding holes 20A and 20B of clamping plates 13A and 13B respectively. Bolts 20 are at locations where they do not interfere with a desired range of translational movements of shear plate 12 with respect to clamping plates 13. In the illustrated embodiment, holes 20A and 20B are located at corners of clamping plates 13. However this is not mandatory.

In some embodiments damper 10 comprises at least three bolts 20. In some embodiments bolts 20 are located at points along peripheries of clamping plates 13.

In some embodiments clamping plates 13 are slidably coupled to one another by a slide mechanism. The slide mechanism may maintain clamping plates 13 parallel to one another while allowing clamping plates 13 to move away and toward one another. In some embodiments the sliding mechanism comprises a pair of bars projecting generally perpendicularly to one of the clamping plates 13. The pair of bars may be engaged in a corresponding pair of keyways or apertures in the other one of the clamping plates 13. In some embodiments the sliding mechanism comprises more than two bars.

Stoppers 18 limit travel of shear plate 12 relative to clamping plates 13 and also help to constrain clamping plates 13 to remain parallel to one another and to move only toward or away from one another. In the illustrated embodiment, stoppers 18 are attached to one of clamping plates 13 and engage in features 18A which may, for example be apertures, notches or keyways in the other one of clamping plates 13.

In some embodiments stoppers 18 are positioned to limit a range of travel of shear plate 12 and also serve as bars of a sliding mechanism (e.g. as shown in FIG. 2A).

Coupling members 19A and 19B (collectively coupling members 19) are respectively attached to one of clamping plates 13 and shear plate 12. Coupling members 19 may be used to couple damper 10 between parts of a structure such as between structural steel members of a building or structural parts of a traffic barricade. Coupling members 19A and 19B may have the same or different configurations. Coupling members 19 may be integral with the parts of damper 10 to which they are respectively attached or may be attached in other ways such as by fasteners (e.g. bolts, rivets, pins, etc.), a mechanical interlock (e.g. tongue and groove), welding, brazing etc. Components of the structure may be coupled (e.g. welded, bonded, fastened, etc.) to damper 10 by way of coupling members 19. In some embodiments coupling members 19 are integral with a structural component (e.g. a beam). In some embodiments coupling members 19 are embedded within a structural component (e.g. concrete may be cast around a coupling member 19).

It can be understood from the above that forces applied between shear plate 12 and clamping plates 13 in a plane perpendicular to an axis of male conical element 15 ("transverse forces") can cause shear plate 12 to move in a transverse direction relative to clamping plates 13. Such motion is resisted by:

- friction between active surface portion 15A of male conical element 15 and active surface portion 16A of female conical element 16; and
- friction between face 12B of shear plate 12 and the adjacent face of a clamping plate 13.

That friction dissipates energy from a structure to which damper 10 is attached.

Either or both of clamping plates 13 optionally comprises plural layers that are attached together and/or coupled to move together relative to shear plate 12. In some embodiments a clamping plate 13 includes a friction layer that is adjacent to and bears against face 12B of shear plate 12. The friction layer may be selected to provide a desired coefficient of friction with shear plate 12. In some embodiments a clamping plate 13 includes a member that is joined to a corresponding one of coupling members 19.

Figure 2C:
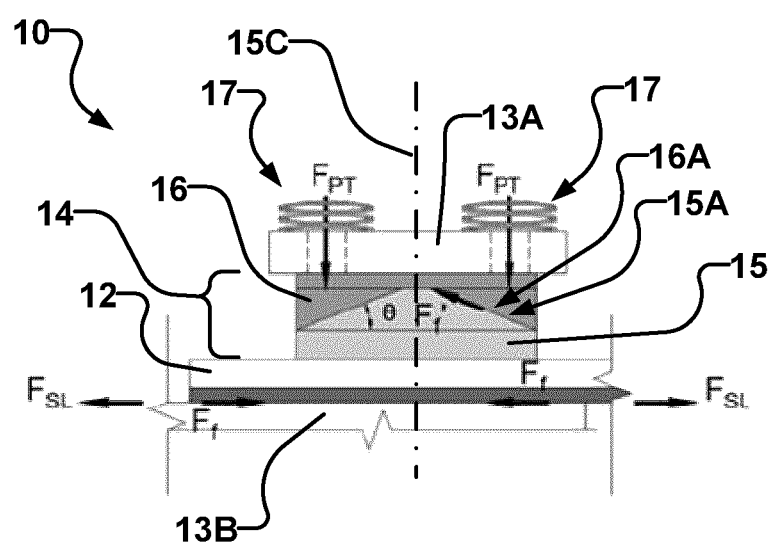
FIG. 2C is a schematic cross-sectional view of the damper of FIG. 1.

FIG. 2C is a schematic cross-sectional view of an example damper 10 in its neutral or resting position. In the neutral position, clamping plates 13 hold active surface portions 15A, 16A of male conical element 15 and female conical element 16 tightly together. Upon a mechanical force being applied between coupling members 19, shear plate 12 moves relative to clamping plates 13. This motion causes active surface portion 15A of male conical element 15 to ride up active surface portion 16A of female conical element 16, thereby wedging clamping plates 13 apart and compressing springs 17. Active surface portion 15A of male conical element 15 may maintain contact with active surface portion 16A of female conical element 16 along a line as male and female conical elements 15, 16 are displaced.

When the force is removed then the compressive force applied by springs 17 to clamping plates 13 acting on conical wedge 14 cause a restoring force which tends to return damper 10 to the neutral position. The compressive force applied by springs 17 may cause active surface 15 of male conical element 15 to slide against active surface 16A of female conical element 16 until male conical element 15 returns to its centered position within indentation 16B of female conical element 16. Advantageously, damper 10 may be designed to return to its neutral or resting state without external forces needing to be applied. As described elsewhere herein, movement of shear plate 12 relative to clamping plates 13 and/or movement of male conical element 15 relative to female conical element 16 is not restricted to any particular transverse direction.

Friction force ($F_f$) between shear plate 12 and the adjacent clamping plate 13 may, for example, be represented as follows:

$$F_f = \mu F_{PT} \qquad (1)$$

wherein μ is the friction coefficient between shear plate 12 and the adjacent clamping plate 13 and $F_{PT}$ is the pretension force applied by springs 17.

Friction force between male conical element 15 and female conical element 16 ($F_f'$) may, for example, be represented as follows:

$$F_f' = \frac{\mu' F_{PT}}{\cos\theta - \mu' \sin\theta} \qquad (2)$$

wherein μ' is the friction coefficient between active surface portion 15A of male conical element 15 and active surface portion 16A of female conical element 16 and θ is the angle of the slope of active surface 15A relative to a base surface of male conical element 15 (e.g. a plane perpendicular to an axis 15C of male conical element 15 (see e.g. FIG. 2C).

FIGS. 3A to 3L illustrate different stages of an example hysteresis cycle of damper 10 upon application of a transverse mechanical force. For the purposes of this example, the direction of the applied mechanical force oscillates (e.g. is applied in one direction and then reverses). FIGS. 3A, 3C, 3E, 3G, 3I and 3K are schematic side views of damper 10. FIGS. 3B, 3D, 3F, 3H, 3J and 3L are graphical representations of corresponding stages of the hysteresis cycle (in these Figures, the x-axis "Δ" corresponds to the relative deformation of damper 10 (e.g. increase in separation between clamping plates 13); the y-axis "F" corresponds to force).

Figure 3A:
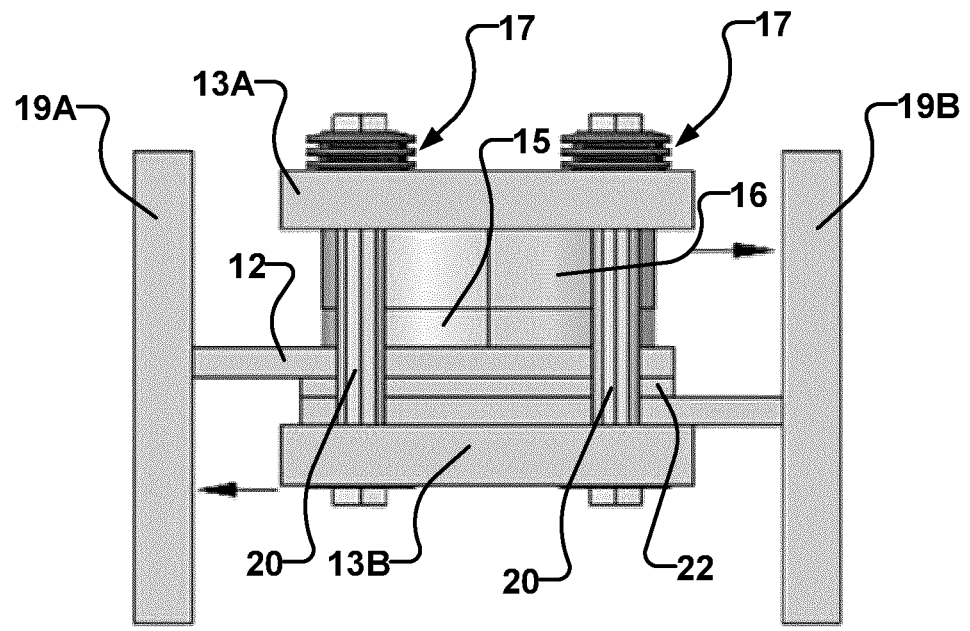
FIGS. 3A to 3L illustrate example stages of a hysteresis cycle of the damper of FIG. 1.
Figure 3B:
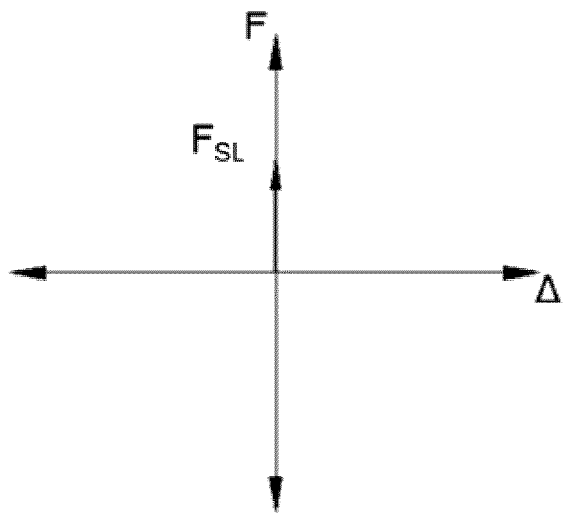

Until an externally applied transverse force has a magnitude that is sufficient to overcome the static friction of damper 10 (i.e. the externally applied force is greater than or equal to a sliding force ($F_{SL}$)), damper 10 behaves like a rigid body remaining in its neutral or resting state with no movement (see e.g. FIGS. 3A and 3B).

Sliding force ($F_{SL}$) may, for example, be represented as follows:

$$F_{SL} = F_{PT}\left(\frac{\tan\theta + \mu'}{1 - u'\tan\theta} + \mu\right) \quad (3)$$

When tuning damper 10, sliding force $F_{SL}$, may be adjusted by varying $F_{PT}$, μ and/or μ'. The magnitude of $F_{SL}$, determines the level of applied force at which damper 10 will start opening.

Figure 3C:
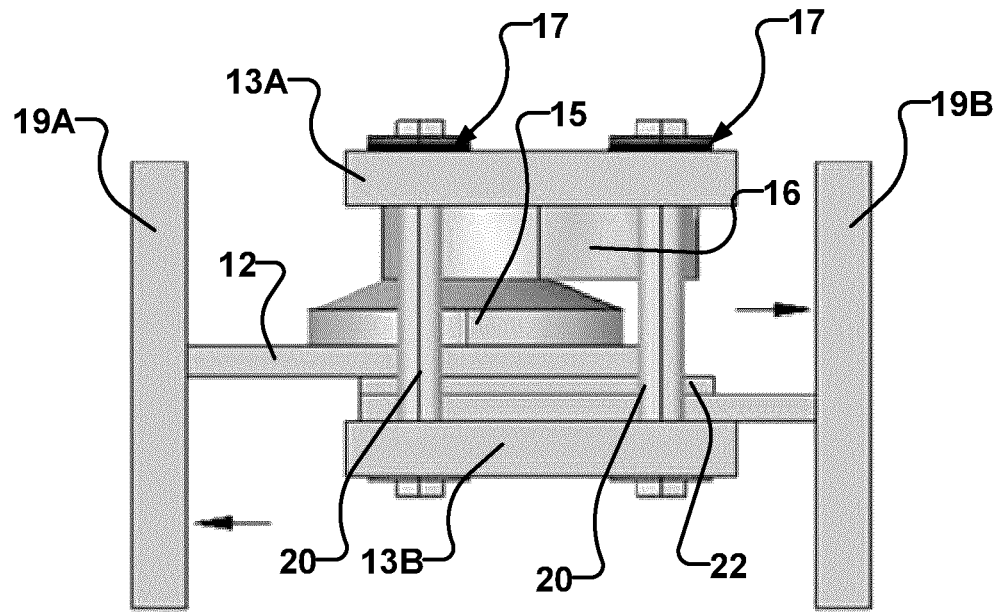
Figure 3D:
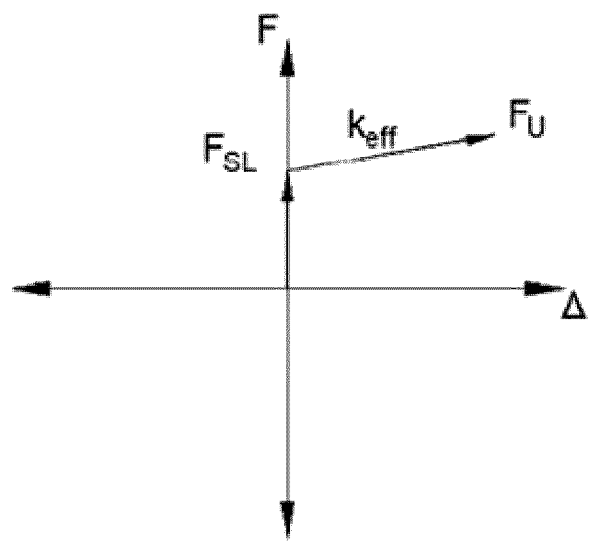
Figure 3E:
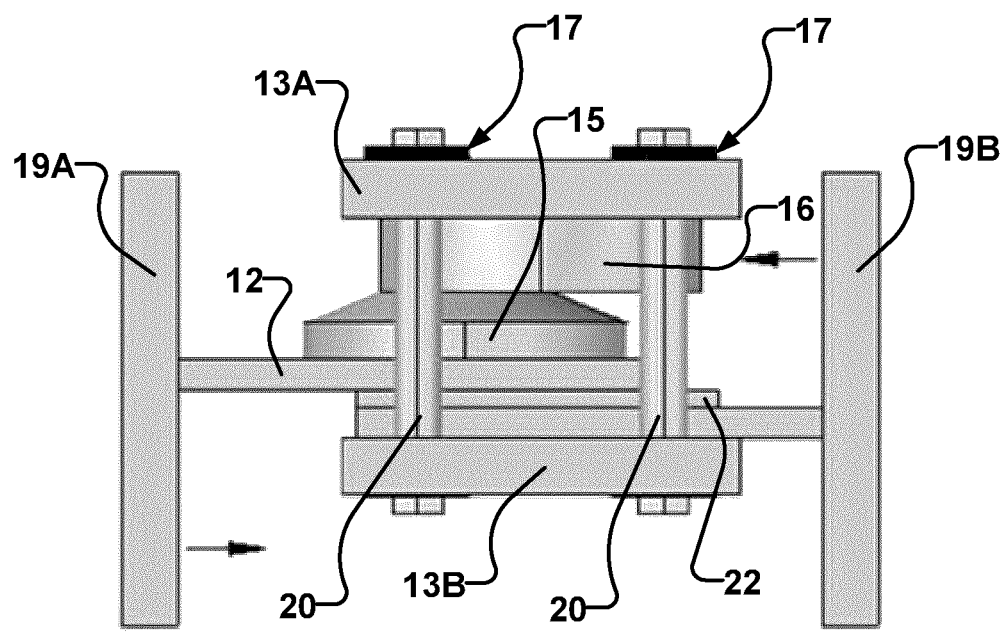
Figure 3F:
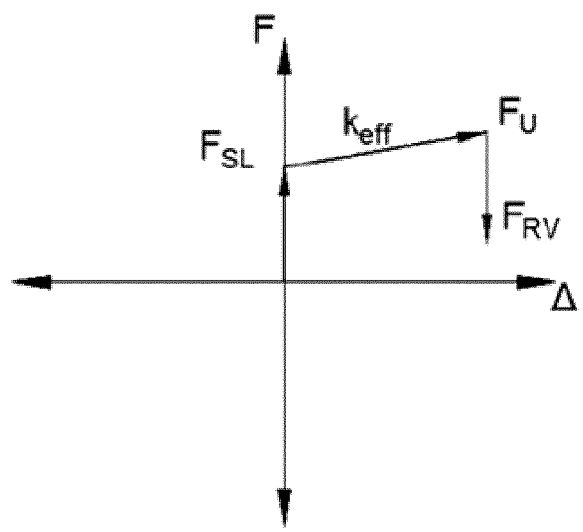
Figure 3G:
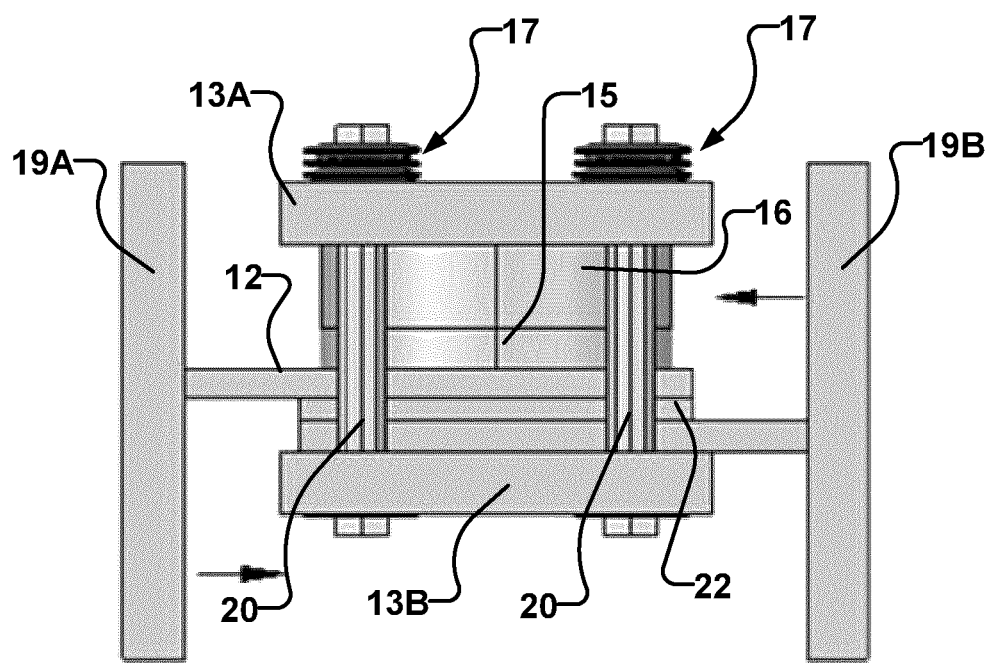

Once the magnitude of the externally applied force reaches or exceeds the sliding force, shear plate 12 moves relative to clamping plates 13 as shown in FIG. 3C. As shear plate 12 translates, conical wedge 14 causes damper 10 to open (i.e. conical wedge 14 forces clamping plates 13 to move farther apart) thereby compressing springs 17. As springs 17 are compressed the normal force applied by springs 17 increases. Friction forces (e.g. friction ($F_f$) between shear plate 12 and the adjacent clamping plate 13 and/or friction ($F_f'$) between male and female conical elements 15, 16) may increase in proportion to the amount of deformation (e.g. opening) of damper 10 (see e.g. FIG. 3D).

Damper 10 may continue opening until: the externally applied force reverses direction, the resistance to movement provided by damper 10 grows to exceed the applied force or the force is no longer applied (or further movement of shear plate 12 is stopped, e.g. by a stopper 18). If for example a reverse force is applied, an ultimate friction force ($F_U$) drops to the reverse force ($F_{RV}$) due to the change of friction direction (see e.g. FIGS. 3E and 3F). In some embodiments the ultimate friction force ($F_U$) drops to the reverse force ($F_{RV}$) immediately.

The ultimate friction force ($F_U$) may, for example, be represented as follows:

$$F_U = F_N\left(\frac{\tan\theta + \mu'}{1 - u'\tan\theta} + \mu\right) \quad (4)$$

wherein $F_N$ represents the additional normal force generated from compression of springs 17 and may, for example, be represented as follows:

$$F_N = F_{PT} + k_{eff}\Delta \tan\theta \quad (5)$$

wherein Δ represent an amount by which the damper has deformed (e.g. an amount by which clamping plates 13 have been separated from one another) and $k_{eff}$ represents the effective stiffness of springs 17.

The reverse force ($F_{RV}$) may, for example, be computed as follows:

$$F_{RV} = F_N\left(\frac{\tan\theta - \mu'}{1 + u'\tan\theta} - \mu\right) \quad (6)$$

As damper 10 returns to its neutral or resting state, springs 17 relax toward their pre-loaded condition. As springs 17 relax the friction forces gradually decrease to the remaining force ($F_{RM}$) (see e.g. FIGS. 3G and 3H).

The remaining force ($F_{RM}$) may, for example, be represented as follows:

$$F_{RM} = F_{PT}\left(\frac{\tan\theta - \mu'}{1 + u'\tan\theta} - \mu\right) \quad (7)$$

Figure 3H:
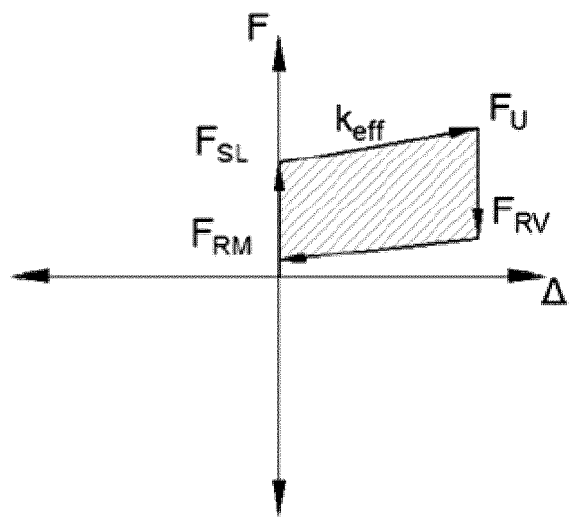
Figure 3I:
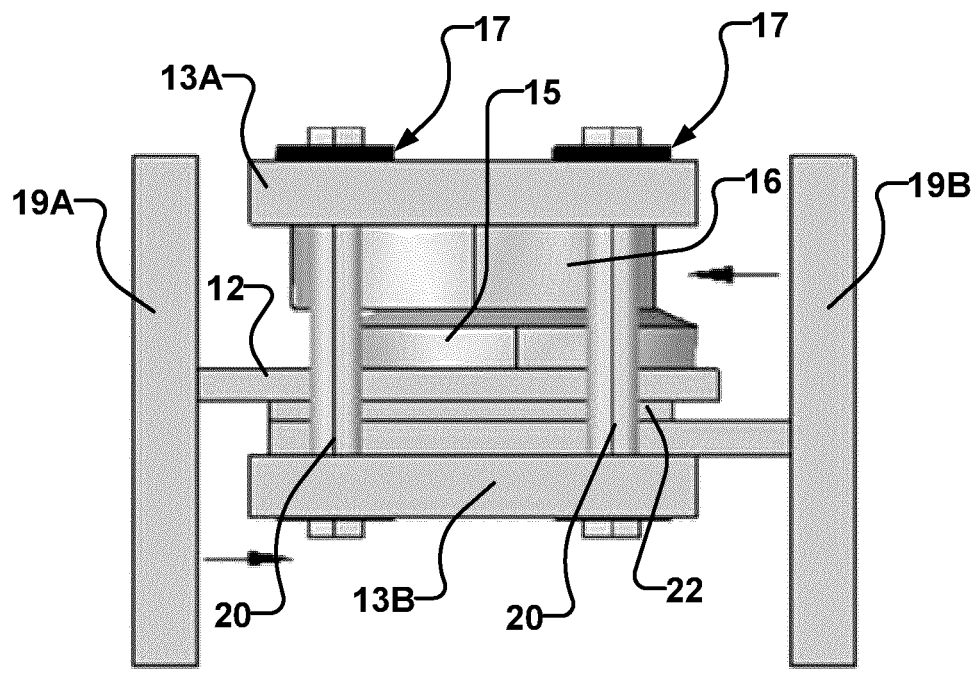
Figure 3J:
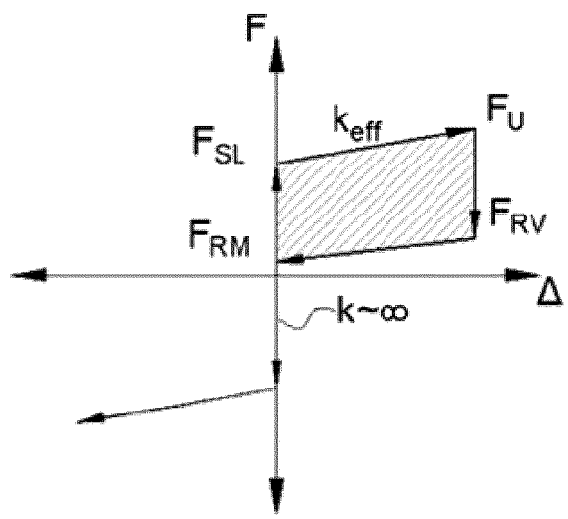

Upon the reverse applied force reaching the sliding force ($F_{SL}$), the shear plate (e.g. shear plate 12) moves relative to clamping plates 13 in the opposite direction and damper 10 deforms again as shown in FIGS. 3I and 3H.

Figure 3K:
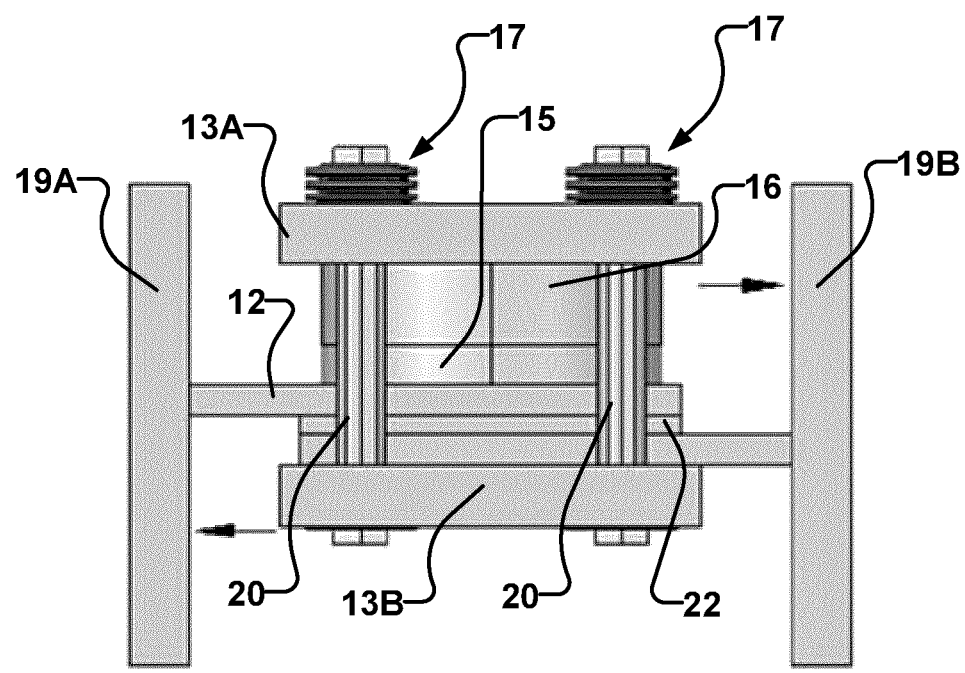
Figure 3L:
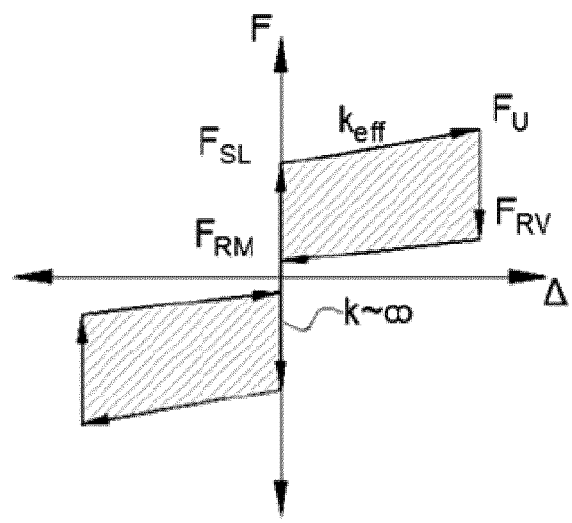

FIGS. 3K and 3L show the complete hysteresis curve (e.g. damper 10 has returned to its neutral or resting position after application of the reverse applied force). As seen in FIG. 3L the complete hysteresis curve comprises two symmetrical flag shapes. In FIG. 3L the shaded areas represent the energy dissipated by damper 10.

Damper 10 may advantageously self-center without residual opening of damper 10 from a beginning oscillation to its final oscillation. As described elsewhere herein "self-center" means that male conical element 15 returns to its centered or "neutral" position within indentation 16B of female conical element 16 in the absence of external forces.

Tuninq of Damper

Damper 10 may be tuned to provide a desired response for a particular application. For example, a damper 10 may be configured to dissipate energy from both small and large applied forces by making friction coefficients μ and μ' relatively small. If the friction coefficients are large and therefore a large amount of force is required for damper 10 to begin deforming, damper 10 will not operate to dissipate energy from small forces (e.g. damper 10 is too rigid). However, if the friction coefficients are too small then damper 10 may not be able to fully dissipate larger applied forces prior to damper 10 reaching its maximum range of motion.

In some embodiments damper 10 is constructed to provide a coefficient of friction that varies with displacement of shear plate 12. For example male and/or female conical elements 15, 16 may be made of or coated with different materials that provide different coefficients of friction. These different materials may, for example be arranged in concentric rings centered on the axis of male and/or female conical elements 15, 16. In some embodiments damper 10 is constructed so that the coefficient of friction between male and female conical elements 15, 16 increases with displacement of shear plate 12 (e.g. damper 10 may be tuned to provide a friction gradient). In such embodiments damper 10 may be capable of dissipating energy from small mechanical forces. As damper 10 opens more, damper 10 may be tuned to provide increasing amounts of friction in order to dissipate energy from larger mechanical forces before damper 10 reaches the end of its range of motion.

Another way to tune damper 10 is through selection of springs 17. For example, springs 17 may be made stiffer or provided with larger pre-load such that larger forces are required before damper 10 begins to open. As another example, springs 17 may be made to have a non-linear relationship of force to compression (e.g. by making springs 17 with sections of different stiffnesses or making springs 17 using a series and parallel arrangement of Belleville washers).

Varying one or more parameters of damper 10 may tune damper 10 to provide a desirable response as described below in more detail.

Slope of Conical Elements

As described above (see e.g. equation (2)) friction forces between male conical element 15 and female conical element 16 depend on the slope (θ) of active surface 15A of male conical element 15 and the friction coefficient μ' between male and female conical elements 15, 16. The resistance provided by damper 10 can be increased or decreased by varying slope (θ) and/or friction coefficient μ' thereby varying the factor of pretension force ($F_{PT}$).

In currently preferred embodiments, normal forces provided by springs 17 exceed the friction forces so that damper 10 will return to its neutral state after external forces are removed. This may, for example, be represented by one of the following expressions:

$$F_N\left(\frac{\tan\theta - \mu'}{1 + \mu' \tan\theta} - \mu\right) > 0 \quad (8A)$$

$$F_N\left(\frac{\tan\theta - \mu'}{1 + \mu' \tan\theta} - \mu\right) = 0 \quad (8B)$$

$$F_N\left(\frac{\tan\theta - \mu'}{1 + \mu' \tan\theta} - \mu\right) < 0 \quad (8C)$$

Each of expressions 8A, 8B and 8C corresponds to a different operating regime and a different hysteresis curve. By selecting appropriate values for the slope θ, μ and μ' one can construct a damper 10 that operates in any of these regimes. The damper 10 may be self-centering in any of these regimes.

Figure 5A:
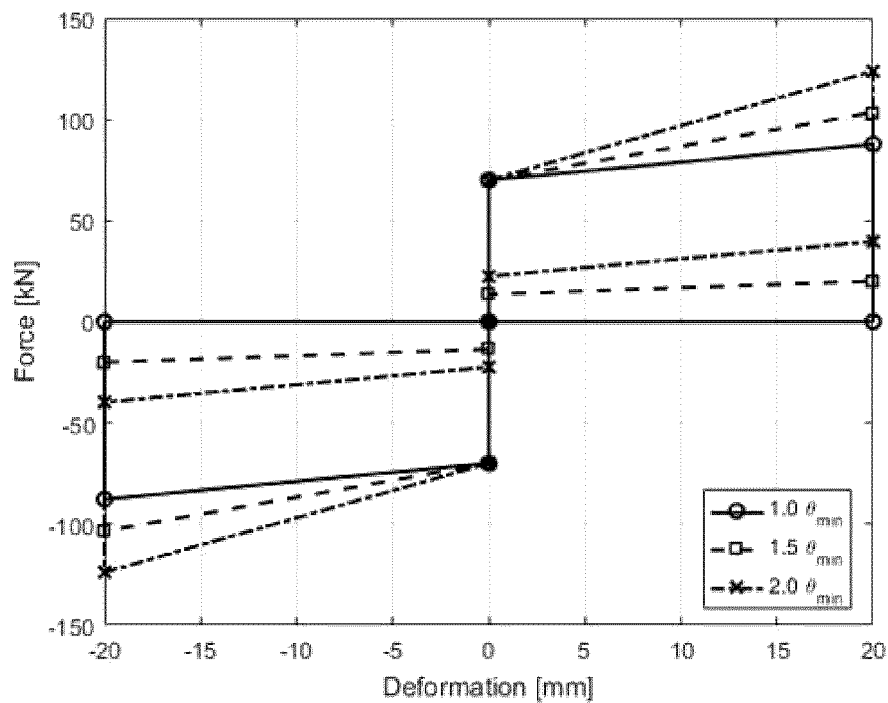
FIG. 5A is a graphical illustration of example force-deformation relationships of the FIG. 1 damper for different slopes of a male conical element.
Figure 5B:
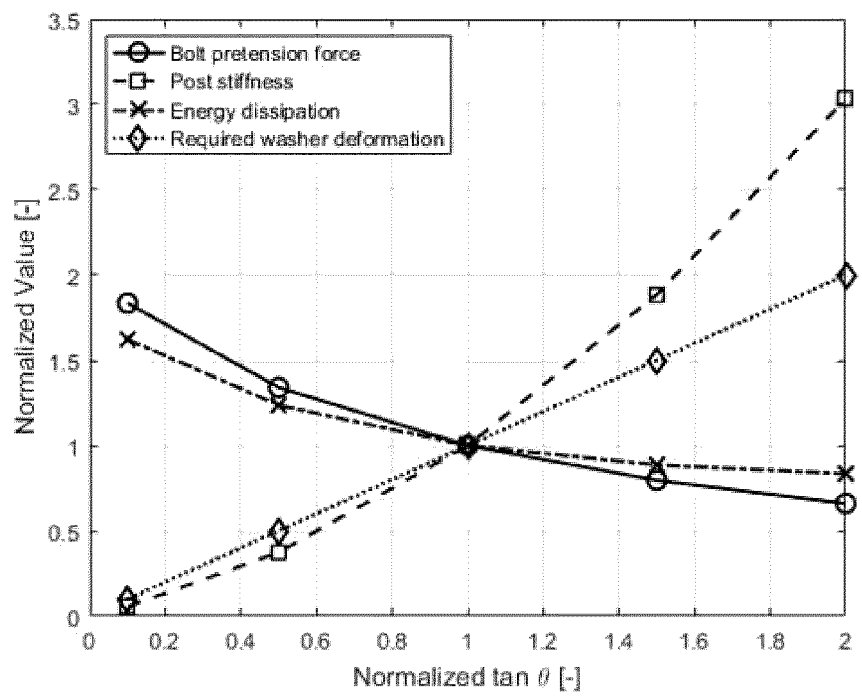
FIG. 5B is a graphical illustration of different example parameters of the FIG. 1 damper for different slopes of a male conical element.
Figure 5C:
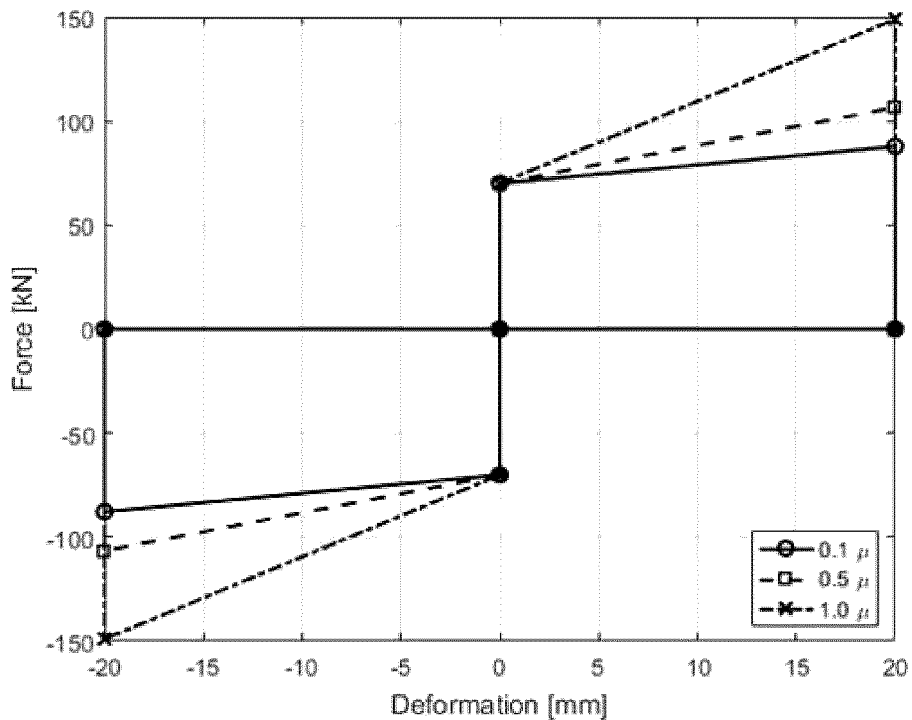
FIG. 5C is a graphical illustration of an example force-deformation relationship of the FIG. 1 damper for different coefficients of friction between a shear plate and a clamping plate.
Figure 5D:
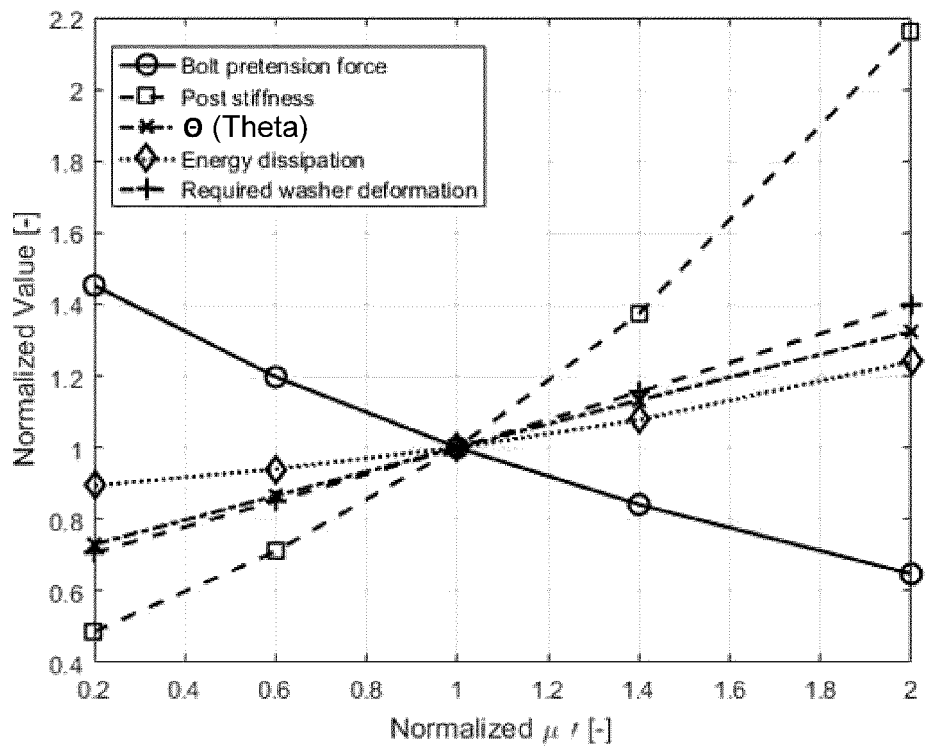
FIG. 5D is a graphical illustration of different example parameters of the FIG. 1 damper for different coefficients of friction between male and female conical elements.
Figure 5E:
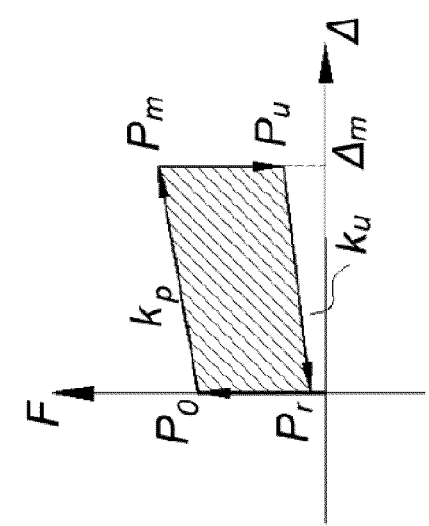
FIGS. 5E, 5F and 5G are hysteresis curves for different regimes of parameters of a damper of the type illustrated in FIG. 1.
Figure 5F:
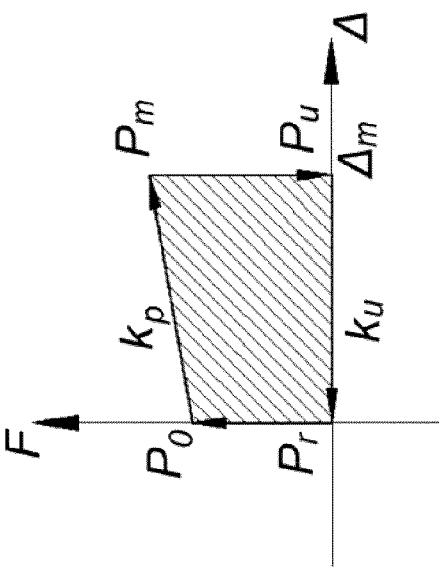
Figure 5G:
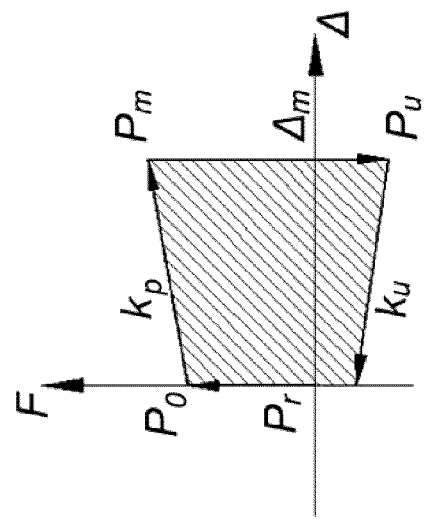

FIGS. 5E, 5F and 5G are respectively hysteresis curves in regimes corresponding to relationships 8A, 8B and 8C.

In some embodiments the slope θ satisfies one of the following relationships:

$$\tan\theta > \frac{\mu + \mu'}{1 - \mu \cdot \mu'} \quad (9A)$$

$$\tan\theta = \frac{\mu + \mu'}{1 - \mu \cdot \mu'} \quad (9B)$$

$$\tan\theta < \frac{\mu + \mu'}{1 - \mu \cdot \mu'} \quad (9C)$$

These relationships respectively correspond to expressions 8A, 8B and 8C.

Male conical element 15 may self-center relative to female conical element 16 as long as slope (θ) is not 0° and μ' is not greater than $$\frac{1}{\tan\theta}.$$

Surface(s) of Conical Elements

In some embodiments different portions of active surface 15A of male conical element 15 and/or the active surface 16A of female conical element 16 may have different friction coefficients.

In some embodiments one or both of active surface 15A of male conical element 14 and active surface 16A of female conical element 16 comprise a plurality of portions, each portion made of a different material and/or having a different surface finish and/or having a different surface treatment. The different portions of active surface 15A of male conical element 14 and/or active surface 16A of female conical element 16 may result in tiered friction coefficients. For example, the first tier may have a low friction coefficient allowing damper 10 to dissipate small forces. In such example case, the last tier may have a high friction coefficient allowing damper 10 to dissipate large amounts of energy and to move in response to large forces without over travelling or reaching limits of a range of motion.

Figure 4A:
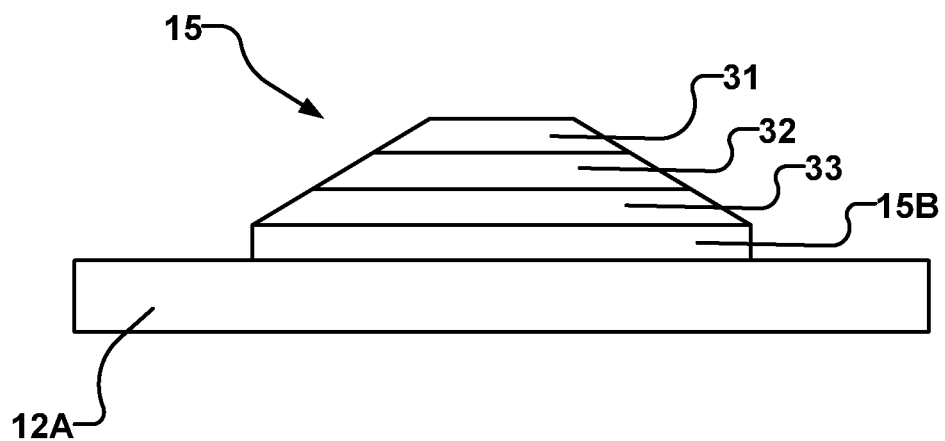
FIG. 4A is a schematic illustration of a male conical element according to an example embodiment of the invention.
Figure 4B:
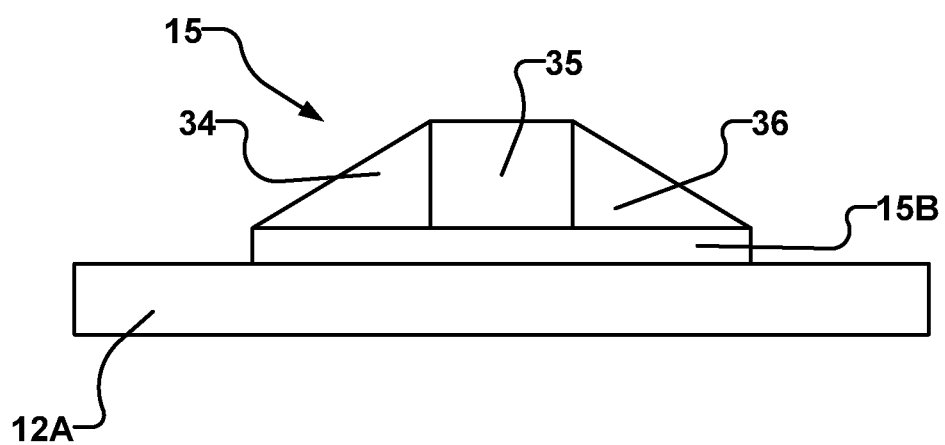
FIG. 4B is a schematic illustration of a male conical element according to an example embodiment of the invention.

The different parts of active surface portion 15A of male conical element 15 and/or active surface portion 16A of female conical element 16 may be made with different materials that provide friction coefficients that vary uniformly or non-uniformly based on direction of the applied force. FIG. 4A shows an example male conical element 15 comprising segments 31, 32 and 33 which extend uniformly around male conical element 15 (e.g. so that response of damper 10 is not dependent on the direction of the applied force). FIG. 4B shows another example male conical element 15 comprising different portions 34, 35, 36 of active surface 15A which do not extend uniformly around male conical element 15 (e.g. response of damper 10 is at least partially dependent on the direction of the applied force).

Friction Between Shear Plate and Clamping Plate

Friction forces ($F_f$) between shear plate 12 and the adjacent clamping plate 13 may be varied by treating a surface of one or both of shear plate 12 and clamping plate 13. Such treatment may vary the friction coefficient μ. In some embodiments smoothness of the surfaces of shear plate 12 and/or the adjacent clamping plate 13 is selected. For example, the surface of shear plate 12 and/or the adjacent clamping plate 13 may be made more coarse to increase the friction coefficient μ or smoother to reduce the friction coefficient μ.

Additionally, or alternatively, shear plate 12 and/or the adjacent clamping plate 13 may be made with, or faced with, a layer of a material or materials chosen to provide a desired friction coefficient μ between shear plate 12 and the abutting surface of the adjacent clamping plate 13. In some embodiments shear plate 12 and/or the adjacent clamping plate 13 comprises a removable facing plate. Interchangeable facing plates may be provided to achieve a desired coefficient of friction. For example, facing plate(s) 22 (see e.g. FIG. 3A) may be made of materials such as Teflon™, brass, steel, etc.

In some embodiments, surfaces of shear plate 12 and/or the adjacent clamping plate 13 are designed to have a varying friction coefficient. For example, during small transverse displacements of shear plate 12 there may be relatively little friction between shear plate 12 and the adjacent clamping plate 13. As damper 10 deforms (i.e. shear plate 12 moves relative to clamping plates 13) surfaces of shear plate 12 and/or the adjacent clamping plate 13 may be designed to provide increasing coefficients of friction.

Varying the Clamping Plates

Clamping plates 13 may be designed so that they do not bend significantly under the forces applied to clamping plates 13 in operation of damper 10. Thickness of clamping plates 13 and/or the number of and locations of bolts 20 may be optimized to achieve a desired response from damper 10.

Springs

As described elsewhere herein, friction between surfaces of the male and female conical elements 15, 16 and/or opposing surfaces of shear plate 12 and the adjacent clamping plate 13 depends significantly on the forces applied by springs 17 (see e.g. equations 1 and 2). Varying the force supplied by springs 17 (by varying springs 17 and/or the amount of pretension applied to springs 17 can vary the response of damper 10. Increasing the force increases friction (e.g. more energy is dissipated for a given movement of shear plate 12). Decreasing the force decreases friction (e.g. less energy is dissipated for a given movement of shear plate 12).

Additionally, or alternatively, the force applied by springs 17 may be altered by varying the stiffness of bolts 20. In some embodiments bolts 20 are elastically extendable when placed in tension such that the force exerted by springs 17 rises more slowly as a function of displacement of shear plate 12 than it otherwise would.

Varying the number of Belleville washers 17A in each spring 17 may vary an amount of normal force ($F_N$) and/or how much damper 10 can open.

In some embodiments the response of damper 10 is controlled by varying how Belleville washers 17A are stacked. For example, if a spring 17 comprises Belleville washers 17A, damper 10 has a different response depending on whether Belleville washers 17A are stacked in parallel (e.g. the washers are stacked in the same direction) or in series (e.g. the washers are stacked in alternating directions). In some embodiments springs 17 are provided by stacks of washers 17A that include some parts where washers 17A are stacked in parallel and other parts where washers 17A are stacked in series.

A force capacity ($P_{total}$) for a spring 17 made up of individual Belleville washers 17A stacked in series may, for example, be represented as follows:

$$P_{total} = n_p P_{ws} \quad (10)$$

wherein $n_p$ is the number of washers 17A in spring 17 that are stacked in parallel and $P_{ws}$ is the flat load of one single washer 17A.

A deformation capacity ($\delta_{total}$) for a spring 17 may, for example, be represented as follows:

$$\delta_{total} = n_s \delta_{ws} \quad (11)$$

wherein $n_s$ is the number of washers 17A in spring 17 that are stacked in series and $\delta_{ws}$ is the amount of deformation required to male one single washer 17A flat.

The effective stiffness ($k_{eff}$) of a spring 17 made up of washers 17A may, for example, be represented as follows:

$$k_{eff} = \frac{P_{total}}{\delta_{total}} = \frac{n_p P_{ws}}{n_s \delta_{ws}} = \frac{n_p}{n_s} k_{ws} \quad (12)$$

wherein $k_{ws}$ is the individual stiffness of a single washer.

As described elsewhere herein, when bolts 20 are pretensioned there is initial deformation of washers 17A. Considering the initial deformation, total deformation demand ($\delta_{demand}$) and total force demand ($P_{demand}$) may, for example, be represented as follows:

$$\delta_{demand} = \frac{F_{PT}}{k_{eff}} + \Delta \tan\theta < \delta_{total} \quad (13)$$

$$P_{demand} = \delta_{demand} k_{eff} < P_{total} \quad (14)$$

Number of Conical Elements

In some embodiments damper 10 comprises a plurality of pairs of associated male and female conical elements 15, 16. Each corresponding pair of the conical elements may be the same or different. Having multiple conical elements may increase capacity of damper 10.

A damper 10 may comprise a plurality of conical wedges 14. Conical wedges 14 may be arranged in parallel (e.g. two or more conical wedges 14 may act between the same shear plate 12 and adjacent clamping elements 13) or in series (e.g. two conical wedges 14 are stacked in series).

Figure 4C:
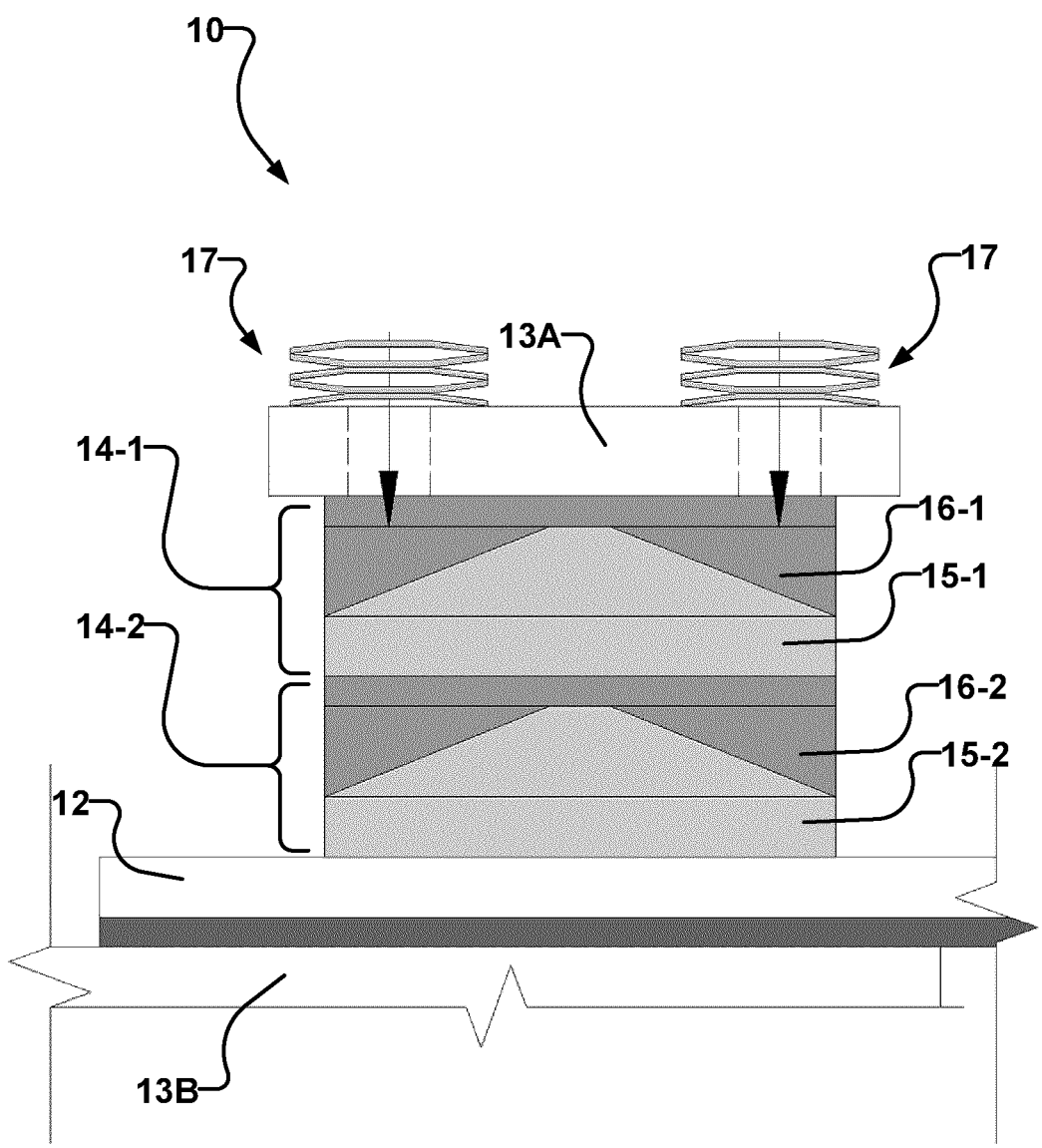
FIG. 4C is a schematic cross-section view of a damper according to an example embodiment of the invention.

FIG. 4C schematically illustrates an example damper 10 comprising conical wedges 14-1 and 14-2 stacked between clamping plate 13A and shear plate 12 (i.e. conical wedges 14-1 and 14-2 are stacked in series). Conical wedges 14-1 and 14-2 may be the same or different. For example, male conical elements of conical wedges 14-1 and 14-2 may have the same or different slopes θ. As another example, conical wedges 14-1 and 14-2 may have the same or different coefficients of friction μ'. Optionally female conical element 16-2 of conical wedge 14-2 is integral with male conical element 15-1 of conical wedge 14-1.

Making at least some of the plurality of conical wedges different from the other conical wedges in the plurality may assist with designing a damper 10 which can effectively dissipate energy over a greater range of applied forces. For example, if conical wedge 14-1 comprises a coefficient of friction μ' that is smaller than μ' is for conical wedge 14-2, conical wedge 14-1 may be activated by smaller applied forces. Once the applied force exceeds a threshold amount, conical wedge 14-2 may be activated to assist with dissipating the larger applied force.

Varying the Stoppers

The position and/or number of stoppers 18 may be varied to vary the range of motion of damper 10. The range of motion of damper 10 may be different in different transverse directions.

Varying the position of stoppers 18 may vary an amount by which shear plate 12 can move in a transverse direction relative to clamping plates 13. For example, moving one or more stoppers 18 away from shear plate 12 may allow shear plate 12 to have a greater range of motion. Moving one or more stoppers 18 closer to shear plate 12 may further restrict the range of motion of shear plate 12.

Although damper 10 has been illustrated as comprising two stoppers 18 at opposing ends of clamping plates 13, damper 10 may comprise any number of stoppers 18. In some embodiments damper 10 comprises 4 or more stoppers 18.

Example Experimental Data

As discussed elsewhere herein, the response of damper 10 and the shape of the hysteresis curve may depend on several parameters including: pretension force, the friction coefficient (μ) between shear plate 12 and the adjacent clamping member 13, the friction coefficient (μ') between surfaces of male and female conical elements 15, 16, the slope (θ) of active surface 15A of male conical element 15 and the effective stiffness of springs 17.

FIGS. 5A to 5D graphically show the influence different parameters may have on the hysteresis curve of damper 10. These figures assumed that the sliding force ($F_{SL}$) and the deformation demand ($\delta_{demand}$) are 60 kN and 20 mm respectively.

FIG. 5A illustrates how the hysteresis curve varies with θ. In the damper 10 used to acquire data for FIG. 5A the friction coefficient μ was 0.3. The friction coefficient μ' is assumed to be ten percent of μ (e.g. 0.03). As is shown in FIG. 5A, if the minimum required θ is used, there is no residual force and the stiffness at an unloading stage of damper 10 is zero. As θ increases, the unloading stiffness increases and the residual force increases at the same time. The hysteresis loop is also lifted which results in a higher ultimate force ($F_U$).

FIG. 5B illustrates how changes in parameters of damper 10 (bolt pretension force, post stiffness, energy dissipation, required washer dissipation) change as θ varies. As θ increases less pretension force is required and the post stiffness is increased without changing springs 17. However as θ increases energy dissipation decreases and springs 17 need to allow a larger range of compression.

FIGS. 5C and 5D illustrate changes in the hysteresis loop and parameters of damper 10 as the friction coefficient (μ') between active surfaces 15A, 16A of conical elements 15, 16 respectively is varied. For the purposes of generating these figures, a damper 10 was constructed in which the slope θ was equal to the critical θ value which results in zero residual force. As shown in FIG. 5C as μ' increases:
the energy dissipation and post stiffness of damper 10 increase.

As shown in FIG. 5D, as μ' increases the required θ increases which in turn:
requires springs 17 to accommodate more deformation.
permits lower pretension force;
dissipates more energy; and
increases the ultimate force.

Example Energy Dissipation From Surfaces of Damper 10

Figure 6C:
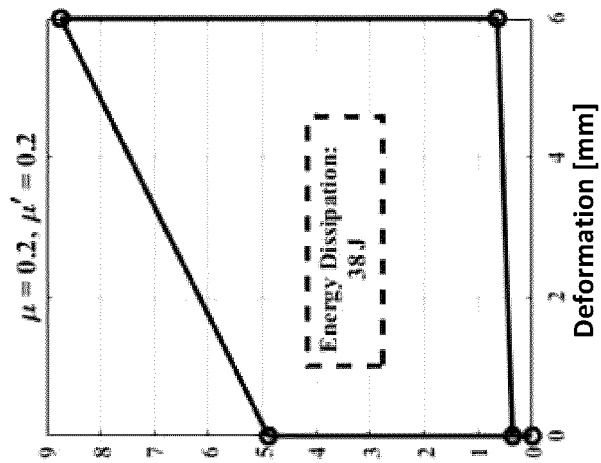
FIGS. 6A to 6C are graphical illustrations of different example energy dissipation curves for the FIG. 1 damper for different coefficients of friction.
Figure 6B:
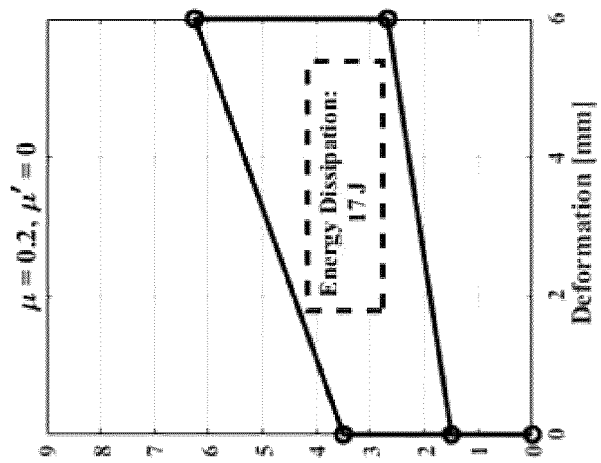
Figure 6A:
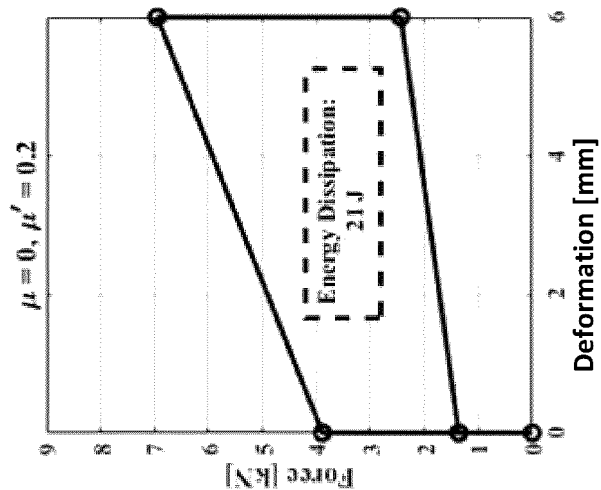

To investigate the energy dissipation contribution from different surfaces of damper 10 (e.g. the surface at which shear plate 12 abuts the adjoining clamping plate 13 and the surface at which male and female conical elements 15, 16 contact one another, bolt pre-tension force and slope (θ) were kept constant. It was observed that the sum of energy dissipation from flat surfaces (e.g. surfaces between sheer plate 12 and adjoining clamping plate 13) and conical surfaces (e.g. surfaces between male and female conical elements 15, 16) is equal to the total energy dissipation of damper 10. FIGS. 6A to 6C are hysteresis curves for three different cases:
Case 1: μ=0; μ'=0.2 (all energy dissipation comes from conical surfaces) (see FIG. 6A);
Case 2: μ=0.2; μ'=0.0 (all energy dissipation comes from flat surfaces) (see FIG. 6B);
Case 3: μ=0.2; μ'=0.2 (energy dissipation comes from both flat and conical surfaces) (see FIG. 6C).

It can be seen from these Figures that the conical surfaces (e.g. surfaces at interfaces between conical elements 15, 16) have a higher energy dissipation capacity than the flat surfaces (e.g. surfaces between shear plate 12 and adjacent clamping plate 13) given the same friction coefficient.

Figure 7:
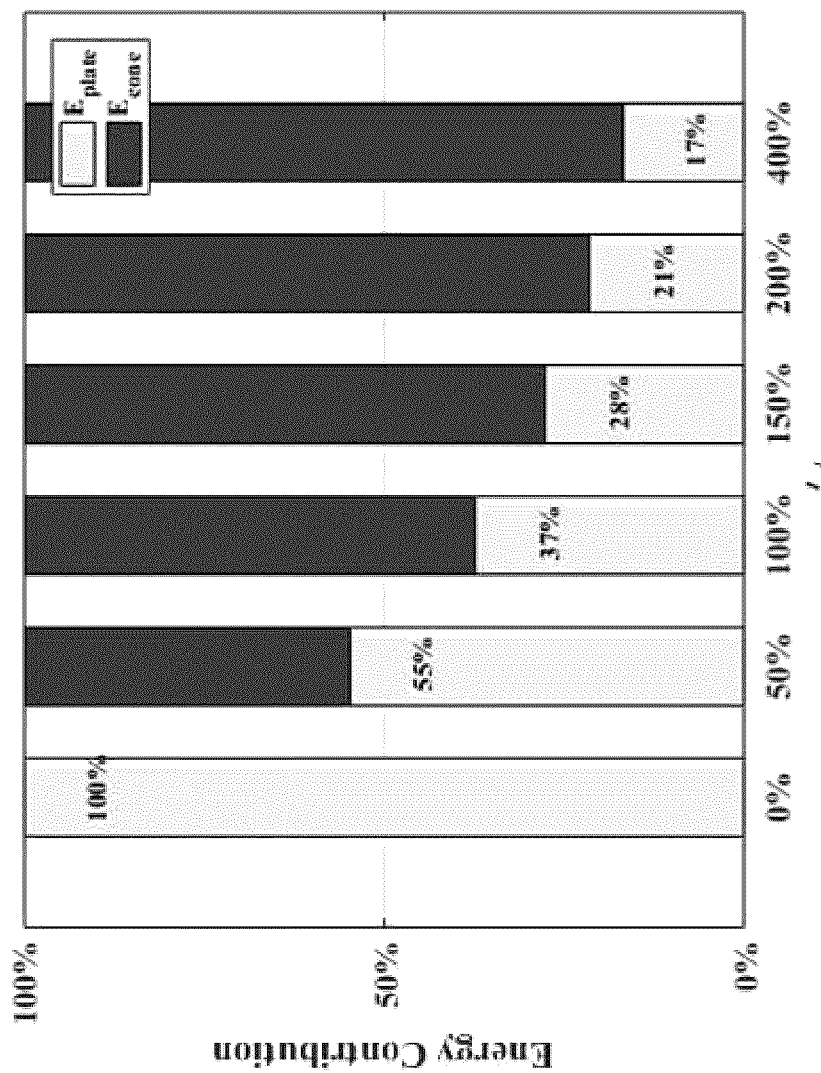
FIG. 7 is a graphical illustration showing example energy dissipation distribution of the FIG. 1 damper.

As the magnitude of the friction coefficients vary, the percentage distribution of energy dissipation between the flat surfaces and the conical surfaces changes. FIG. 7 shows an energy dissipation contribution from the flat surfaces (i.e. "$E_{plate}$"; light shading) decrease as the friction coefficient between the conical surfaces increases (i.e. "$E_{cone}$"; dark shading).

Example Advantages

Damper 10 may have various advantages over some other damping devices. For example damper 10 may provide one or more of the following advantages:
damper 10 can function under simultaneous loading in multiple transverse directions (i.e. multiple forces may be applied to damper 10 simultaneously in different transverse directions);
an effective force which damper 10 dissipates is the vector sum of all of the simultaneously applied transverse forces;
pivoting and/or rotation of shear plate 12 relative to clamping plates 13 does not render damper 10 inoperative and can occur without damaging damper 10.
damper 10 may be made to be highly tunable (e.g. male and/or female conical elements 15, 16 and/or one or more facing plates 22 and/or springs 17 may be interchangeable to allow selection of a desired slope θ, coefficient of friction μ, coefficient of friction μ', pretension force applied by springs 17 and/or force/displacement curve for springs 17.
damper 10 may be made in a manner that is robust, has a low likelihood of failure and is cost effective.

Example Applications

Damper 10 may be used to dissipate energy in the structure of a building as a result of an earthquake shaking the building, an extreme weather event, an explosion or the like. For example, a damper 10 may be coupled between first and second structural members of the building. In some embodiments the first structural member is a horizontal member and the second structural member is a vertical member. For example, the first structure member may comprise a header or lintel over an opening such as an opening into an elevator shaft or another opening into a core of a building. The second structural member may comprise a vertical member which provides support to the first structural member. The building may have two or more stories. For example the building may be a skyscraper.

In some embodiments one or more dampers 10 are installed within a vehicle barricade (e.g. a barricade on the side of the road, on a bridge, etc.). Upon impact of a vehicle with the barricade, damper 10 may dissipate energy from the vehicle impact and may subsequently return to its neutral or resting state once the forces have been dissipated.

In some embodiments one or more dampers 10 are installed in an explosive barrier (i.e. a barrier designed to absorb and dissipate forces resulting from an explosion). For example, such a barrier may be provided to protect people or structures from terrorist explosive devices. Upon detonation of the device, damper 10 may dissipate energy from the force of the explosion on the explosive barrier. For example, damper(s) 10 may be included in supports that attach a movable outer wall that carries forces from an explosion to a fixed inner structure. An array of dampers 10 may support the outer wall. Once the forces have been dissipated, the damper(s) 10 may return to their neutral or resting state and return the explosive barrier to its original state.

Other applications are also possible. In general, one or more dampers as described herein may be applied to absorb energy from forces applied to any structure by weather, explosion, impact with something, seismic activity or other origin.

Some Example Variations

The embodiments described herein are merely examples. These embodiments may be varied in a large number of ways to create other embodiments. Some non-limiting examples of such variations include:

- Elastic bolts 20 may be used to bias clamping plates 13 together with or without separate springs 17.
- Conical wedge 14 may be located between shear plate 12 and clamping plate 13B.
- Conical wedges 14 may be provided on opposing sides of shear plate 12 (in the gaps between shear plate 12 and each of clamping plates 13A and 13B).
- Although male conical element 15 has been shown as being affixed to shear plate 12 and female conical element 16 has been shown as being affixed to a clamping plate 13, orientation of conical wedge 14 could be reversed so that male conical element 15 is affixed to one of clamping plates 13 and the corresponding female conical element 16 is affixed to shear plate 12.
- Additional stop members 18 may be provided to limit travel of shear plate 12 in other transverse directions.
- It is convenient but not mandatory for clamping plates 13 to have the form of plates. For example, a clamping plate that is attached to a male conical element 15 or a female conical element 16 could have any form that supports the male conical element 15 or female conical element 16 while allowing operation of the damper as described herein. One or both of clamping plates 13 may be apertured or have a webbed structure and/or comprise arms extending between the bias mechanism and wedge 14, etc.
- Although male conical element 15 and female conical element 16 may optionally have active surface portions that deviate from being conical. In some embodiments the active surface of male conical element 15 is a convex surface and the active surface of female conical element is a concave surface. In some embodiments active surface portions of one or both of male conical element 15 and female conical element 16 are spherical, elliptic and/or the like.
- Conical elements 15 and 16 are not necessarily circularly symmetrical (e.g. about axis 15C). Conical elements 15 and 16 may be flattened in one direction more than another such that the slope θ varies with the direction in which conical element 15 is displaced transversely relative to conical element 16. For example, cross sections through the active surface portion of male conical element 15 could be ellipses.
- In some embodiments damper 10 comprises one or more or any combination of the following parameters:
  - slope (θ) is in the range of about 10° and 25°±10%;
  - friction coefficient μ is in the range of about 0.01 and 0.5±10%;
  - friction coefficient μ' is in the range of about 0.01 and 0.5±10%;
  - pretension force ($F_{PT}$) is in the range of about 10 kN and 1000 kN±10%;
  - a diameter of a conical wedge 14 is in the range of about 100 mm and 250 mm±10%;
  - a thickness of a clamping plate 13 is in the range of about 15 mm and 35 mm±10%.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a shear plate, conical element, bolt, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A mechanical damper comprising:
   a pair of clamping plates;
   a shear plate located between the pair of clamping plates, the shear plate having a face frictionally engaged with a first one of the clamping plates and movable in a transverse direction relative to the pair of clamping plates, the shear plate and the first one of the clamping plates frictionally engaged with a coefficient of friction $\mu$;
   a wedge coupled between a second one of the clamping plates and the shear plate, the wedge comprising a female element and a male element that projects into an indentation in the female element with an active surface portion of the male element in frictional contact with an active surface portion of the female element, the active surface portions of the male and female elements frictionally engaged with a coefficient of friction $\mu'$, the active surface portion of the male elements being convex and active surface portion of the female element being concave;
   a bias mechanism operative to compress the shear plate and wedge between the clamping plates;
   a first coupling member connected to move together with the shear plate;
   a second coupling member connected to move together with the pair of clamping plates; and
   wherein the wedge is a conical wedge and the male and female elements are conical elements wherein the active surface portions of the male and female conical elements lie on conical surfaces and the active surface portions of the male and female conical elements have a slope angle ($\theta$) relative to a base surface perpendicular to an axis of the male conical element.

2. The mechanical damper according to claim 1 wherein the bias mechanism comprises a plurality of springs and a plurality of bolts that each pass through a corresponding clearance hole in one of the clamping plates and wherein each of the plurality of springs is arranged to apply tension to a corresponding one of the plurality of bolts, wherein the clearance holes are spaced apart around a periphery of the one of the clamping plates.

3. The mechanical damper according to claim 1 wherein the active surface portion of the male conical element lies on a first conical surface having a first cone angle and the active surface portion of the female conical element lies on a second conical surface having the first cone angle.

4. The mechanical damper according to claim 3 wherein the active surface portion of the male conical element has the form of a truncated cone.

5. The mechanical damper according to claim 1 wherein the active surface portion of the male conical element is formed to maintain contact with the active surface portion of the female conical element along a line as the male and female conical elements are displaced relative to one another in a transverse direction perpendicular to an axis of the male conical element.

6. The mechanical damper according to claim 1 wherein in the absence of applied force to the mechanical damper, the mechanical damper is self-centering.

7. The mechanical damper according to claim 1 wherein the shear plate is movable relative to the clamping plates in two mutually perpendicular transverse directions.

8. The mechanical damper according to claim 1 wherein the first and second clamping plates are slidably coupled to one another by a slide mechanism which maintains the first and second clamping plates parallel to one another.

9. The mechanical damper according to claim 1 comprising plural stoppers arranged to limit travel of the shear plate relative to the clamping plates to a set range in at least one transverse direction.

10. The mechanical damper according to claim 1 wherein at least one of the shear plate and the first clamping plate comprises a friction layer that bears against the other of the shear plate and the first clamping plate wherein:
    the friction layer comprises a material having a coefficient of friction that does not exceed 0.5; and/or
    the friction layer comprises a plastic material; and/or
    the friction layer comprises one or more of Teflon, brass and steel; and/or
    friction layer is on an interchangeable facing plate.

11. The mechanical damper according to claim 1 wherein the coefficient of friction between the active surface portions of the male and female conical elements $\mu'$ increases with transverse displacements of the shear plate.

12. The mechanical damper according to claim 1 wherein the active surface portion of the male conical element comprises a first material located inside a ring of a second material different from the first material.

13. The mechanical damper according to claim 1 wherein one or both of the active surface portion of the male conical element and the active surface portion of the female conical element is coated with a friction modifying coating.

14. The mechanical damper according to claim 1 wherein, when the male conical element is in a neutral position in which the male conical element is centered relative to the female conical element, the male conical element bears against the female conical element with a pretension force of at least 10 kN.

15. The mechanical damper according to claim 1 wherein the shear plate and either the male conical element or the female conical element are provided by a single casting.

16. The mechanical damper according to claim 1 comprising a second conical wedge wherein the second conical wedge is positioned between the second one of the clamping plates and the shear plate in parallel with the first conical wedge.

17. The mechanical damper according to claim 1 comprising a second conical wedge wherein the second conical wedge is positioned between the second one of the clamping plates and the shear plate in series with the first conical wedge.

18. The mechanical damper according to claim 1 wherein the slope angle ($\theta$) of one or both of the active surface portions of the male and female conical elements is in the range of 10° and 25°.

19. A structure comprising first and second structural members connected to one another by a mechanical damper according to claim 1 wherein the mechanical damper is connected to the first and second structural members respectively by the first and second coupling members and one of the first and second structural members is a vertical member and the other one of the first and second structural members is a horizontal member.

20. A mechanical damper comprising:
a pair of clamping members;
a shear plate located between the pair of clamping members, the shear plate having a face frictionally engaged with a first one of the clamping members and movable in a transverse direction relative to the pair of clamping members;
a wedge coupled between a second one of the clamping members and the shear plate, the wedge comprising a female element and a male element that projects into an indentation in the female element with an active surface portion of the male element in frictional contact with an active surface portion of the female element;
a bias mechanism operative to compress the shear plate and wedge between the clamping members;
a first coupling member connected to move together with the shear plate;
a second coupling member connected to move together with the pair of clamping members; and
wherein the wedge is a conical wedge and the male and female elements are conical elements wherein the active surface portions of the male and female conical elements lie on conical surfaces and the active surface portions of the male and female conical elements have a slope angle ($\theta$) relative to a base surface perpendicular to an axis of the male conical element.

* * * * *